(12) United States Patent
Bruns et al.

(10) Patent No.: US 12,371,905 B2
(45) Date of Patent: *Jul. 29, 2025

(54) IMPACT RESISTANT SHINGLE INCLUDING LOCAL POLYMER CONCENTRATION ASPHALT SHINGLE COATING

(71) Applicant: ASPHALT SCIENCES LLC, Reno, NV (US)

(72) Inventors: Joseph Randall Bruns, Scurry, TX (US); Sumer S. Lucas, Waxahachie, TX (US)

(73) Assignee: ASPHALT SCIENCES LLC, Reno, NV (US)

( * ) Notice: Subject to any disclaimer, the term of this patent is extended or adjusted under 35 U.S.C. 154(b) by 219 days.

This patent is subject to a terminal disclaimer.

(21) Appl. No.: 18/092,284

(22) Filed: Dec. 31, 2022

(65) Prior Publication Data

US 2024/0218666 A1    Jul. 4, 2024

(51) Int. Cl.
| | |
|---|---|
| *E04D 1/00* | (2006.01) |
| *C08K 3/22* | (2006.01) |
| *C08K 5/101* | (2006.01) |
| *C09D 7/61* | (2018.01) |
| *C09D 7/63* | (2018.01) |
| *C09D 7/65* | (2018.01) |

(Continued)

(52) U.S. Cl.
CPC ............ *E04D 1/20* (2013.01); *C08K 3/22* (2013.01); *C08K 5/101* (2013.01); *C09D 7/61* (2018.01); *C09D 7/63* (2018.01); *C09D 7/65* (2018.01); *C09D 109/06* (2013.01); *C09D 195/00* (2013.01); *C08K 2003/2296* (2013.01)

(58) Field of Classification Search
CPC .... E04D 1/12; E04D 1/20; E04D 1/22; C09D 7/65; C09D 7/61; C09D 7/63; C09D 5/101; C09D 109/06; C09D 195/00; C08K 3/22; C08K 5/101; C08K 2003/2296

See application file for complete search history.

(56) References Cited

U.S. PATENT DOCUMENTS

| | | |
|---|---|---|
| 4,068,023 A | 1/1978 | Nielsen et al. |
| 5,492,561 A | 2/1996 | Flanigan |

(Continued)

FOREIGN PATENT DOCUMENTS

| | | |
|---|---|---|
| KR | 101239399 B1 | 3/2013 |
| WO | 2019028286 A1 | 2/2019 |

*Primary Examiner* — Chi Q Nguyen
(74) *Attorney, Agent, or Firm* — Kerr IP Group, LLC

(57) ABSTRACT

An impact resistant shingle that includes a local polymer concentration ("LPC") asphalt shingle coating is described. The LPC asphalt shingle coating includes a saturated polymer ("SP") premix and a LPC premix blended and heated to between 320° F. and 500° F. for between 30 minutes and 240 minutes. The SP premix includes a bitumen feedstock and a cross-linking agent heated to between 320° F. and 500° F. and mixed for between 15 minutes and 60 minutes. The bitumen feedstock includes at least one of a bitumen and a rapid digestion process ("RDP") compound that includes one of: an unmodified RDP compound, a modified RDP compound, an enhanced RDP compound, and a modified enhanced RDP compound. The LPC premix includes an asphalt feedstock and a cross-linking polymer heated to between 320° F. and 500° F. and mixed for 1 minute to 60 minutes.

20 Claims, 8 Drawing Sheets

(51) Int. Cl.
*C09D 109/06* (2006.01)
*C09D 195/00* (2006.01)
*E04D 1/20* (2006.01)

(56) References Cited

U.S. PATENT DOCUMENTS

| | | |
|---|---|---|
| 6,709,994 B2 | 3/2004 | Miller et al. |
| 6,713,540 B2 | 3/2004 | Rached et al. |
| 10,457,602 B1 | 10/2019 | Davis |
| 10,487,209 B2 * | 11/2019 | Naidoo ................ C09D 195/00 |
| 10,858,833 B2 * | 12/2020 | Jenkins ..................... E04D 1/20 |
| 11,987,672 B2 * | 5/2024 | Di Mondo .............. C08L 23/06 |
| 2007/0261337 A1 * | 11/2007 | Whitaker ............ C04B 20/1018 |
| | | 52/300 |
| 2008/0115444 A1 * | 5/2008 | Kalkanoglu ............... E04D 5/12 |
| | | 52/518 |
| 2009/0105376 A1 | 4/2009 | Korenstra et al. |
| 2010/0098912 A1 | 4/2010 | Snyder et al. |
| 2011/0165376 A1 * | 7/2011 | Whitaker ................ C08L 95/00 |
| | | 106/668 |
| 2011/0196074 A1 | 8/2011 | Flanigan |
| 2011/0281094 A1 * | 11/2011 | Zanchetta ................. E04D 5/10 |
| | | 428/440 |
| 2014/0261076 A1 | 9/2014 | Quinn et al. |
| 2014/0271440 A1 * | 9/2014 | Constantz ............... C09C 1/021 |
| | | 423/430 |
| 2024/0101863 A1 * | 3/2024 | Bruns ................... C09D 153/02 |
| 2024/0287803 A1 * | 8/2024 | Florean ................... D06N 5/00 |

\* cited by examiner

IMPACT RESISTANT SHINGLE INCLUDING LOCAL POLYMER CONCENTRATION ASPHALT SHINGLE COATING

CROSS REFERENCE

This patent application incorporates by reference the content and disclosure of U.S. patent application Ser. No. 18/092,275 filed Dec. 31, 2022 and entitled METHOD FOR GENERATING LOCAL POLYMER CONCENTRATION ASPHALT SHINGLE COATINGS.

FIELD

This invention relates to an impact resistant shingle that includes a local polymer concentration asphalt shingle coating. More specifically, the invention relates to a method for controlling local polymer concentrations in bitumen compounds containing dissolved tire rubber and the resulting compositions thereof.

BACKGROUND

Bitumen is a complex colloid comprised of asphaltenes suspended in oils and resins commonly referred to as the maltene fraction. The chemical composition of the maltene fraction has a significant effect on the penetration, softening point, and viscosity of bitumen as lighter components are converted into larger molecules.

Crude oils are a naturally occurring complex mixture composed predominantly of hydrogen and carbon containing compounds. They vary widely in relative amounts and characteristics of different hydrocarbons. There are various systems for classification of crude oil. One such system classified oil as paraffin, asphaltic (naphthenic), or mixed-based depending upon the type of hydrocarbon present in the crude. Alternatively, crude oil may be classified as heavy crude (20-25 American Petroleum Institute ("API") gravity), refining crude (25-35 API gravity) or light crude (35-40 API gravity). Heavy crudes (20-25 API gravity) are favored for production of bituminous asphalts because these crudes are rich in asphaltenes.

Bitumens have been modified with rubber and elastomers to improve the properties of the resulting composition. For example, in Trumbore, U.S. Pat. No. 5,342,866, teaches an elastomeric-bitumen composition with improved low temperature performance and reduced resistance to flow at high temperatures. The Trumbore asphalt incorporates SBS and SIS block copolymers as the elastomeric compounds, but does not phase separate and is compatible to production at high temperatures up to 475° F. (246° C.). While Nielsen, U.S. Pat. No. 4,068,023, teaches one of the earliest examples showing the incorporation of reclaimed rubber into asphalt for paving using elevated temperatures up to 450° F. (232° C.) with an admixture of aromatic oils.

Each year the U.S. generates approximately 290 million scrap tires. About 12 million scrap tires are converted into ground tire rubber ("GTR") or crumb rubber for modifying asphalt cements. The utilization of scrap tire rubber in bitumen started in the mid-1960's when GTR was placed in asphalt bitumen surface treatments, such as chip seal applications.

Martin, EP1877493, teaches a modified asphalt binder composition that includes about 40% by weight to about 98.9% by weight asphalt binder material, about 0.5% by weight to about 25% by weight crumb rubber, about 0.5% by weight to about 30% by weight of at least one synthetic polymer, and about 0.05% by weight to about 5% by weight of at least one acid. Martin also teaches a method for making a modified asphalt binder composition that includes providing neat asphalt, heating the neat asphalt to a temperature of between about 120° C. (248° F.) and about 200° C. (392° F.), adding modifying ingredients to the neat asphalt sequentially with mixing for period of between about 5 minutes and about 10 hours each, and agitating the with a low shear mixer or a high shear mixer for an additional period of between about 5 minutes and about 48 hours.

Davis, U.S. Pat. No. 10,457,602, teaches asphalt formulations and methods of preparation suitable for roofing products that incorporate elastomers, post-consumer recycled olefinic polymers, and 10-80 mesh GTR. However, the inclusion of olefinic polymers, and especially polypropylene, disadvantageously decreases the impact resistance performance of asphalt shingle roof coatings. In all the disclosed formulations Davis limits the incorporation of GTR to 20% or less by weight and the incorporation of polymer elastomers to 18% or less by weight. Further, Davis limits the disclosed methods of preparation to mixing temperatures below 425° F. (218° C.).

In terms of environmental concerns, the disposal of scrap tires is a major waste management issue. While these environmental concerns are important, there are various challenges associated with using GTR and other forms of scrap tire rubber.

An initial challenge encountered with the use of GTR or crumb rubber is their respective production. Both crumb rubber and GTR, such as ASTM Standards D5603 and 5644, are commonly prepared by removing steel belts, bead wire, and various incorporated fabric plies from scrap tires. Entire processing facilities are required for removal of steel belts, bead wire and other byproducts incorporated into the scrap tires.

For another example, with respect to hot applied chip seal, the inconsistent dissolution of GTR and other forms of scrap tire rubber in asphalt bitumen can result in blockages to hot asphalt spray systems that apply the GTR/asphalt mixture. With respect to asphalt emulsions, the inconsistent dissolution of tire rubber in asphalt can interfere with the emulsification of asphalt in water due to the interference of the discrete undissolved rubber particles in the asphalt water inversion process. With respect to asphalt cutback, inconsistent dissolution of tire rubber in asphalt bitumen can result in blockages in cold asphalt spray systems used to apply the tire rubber solvent cut back asphalt to the road surface when used in gravel chip seals. With respect to tack coats, inconsistent dissolution of tire rubber in asphalt can interfere with even distribution and blockages in the spray applicator that may ultimately result in inferior pavement systems due to improper layer adhesion. With respect to pavement membranes, inconsistent dissolution of tire rubber in asphalt bitumen can interfere with even distribution and blockages in the spray applicator that may ultimately result in inferior pavement systems due to improper adhesion between the reinforcements and the pavement layers. With respect to pavement joint and caulking fillers, inconsistent dissolution of tire rubber in asphalt bitumen used in caulking formulations can interfere with even distribution and blockages in various applicators that may ultimately result in inferior sealing for pavement joints shortened road longevity. With respect to driveway sealers, inconsistent dissolution of tire rubber in asphalt used in driveway seal formulations can interfere with even distribution and sealing of the drive surface resulting in reduced protection.

Flanigan, U.S. Pat. No. 5,492,561, teaches incorporating the whole tire rubber into the asphalt medium by simulating a "boiling action" in the asphalt medium which allows the tire rubber to be absorbed into the asphalt medium at about 500° F. Flanigan states that below 485° F.-490° F. provides insufficient blending, while above 510° F. the temperature is too close to the flash point of the liquid. According to Flanigan, a temperature of about 500° F. is the safest temperature to use that is high enough to provide full incorporation of whole tire rubber granules into the asphalt medium but not so high that the process becomes unsafe. The Flanigan process produces a dissolved GTR after extended blending of 5-10 hours at 500° F., which degrades the asphalt blend by initiating an extended oxidation reaction that affects the quality of the asphalt. Additionally, Flanigan only generically considers the addition of elastomeric polymers to the asphalt/GTR blend without providing any instruction as to the type, amount, or in situ chemistry of those elastomeric polymer additives.

Coe, W.O. 2019/028286, teaches methods of substituting interlinks of elastomers in vulcanized end of life ("EOL") tire crumb rubber particles in order to allow the recombination of the EOL tire crumb rubber particles such that individual, complex, heterogeneous, cross linked moieties are re-entangled into a monolithic structure with uniform mechanical properties comparable to those of the rubber matrix prior to granulation. This re-entanglement required the destruction of the weakest existing cross-links in recycled vulcanized rubber allowed for greatly increased value of the end product, which could be used in the production of a variety of products including new tires. However, re-entanglement arises from depolymerization and repolymerization processes that require a specialized reactor vessel, certain additives that catalyze and/or facilitate the depolymerization and repolymerization reactions, and subjection of the rubber/asphalt slurry to a water-based emulsion.

Rached, U.S. Pat. No. 6,713,540, teaches that sulfur cross-linking in combination with Styrene-Butadiene rubber ("SBR") and Styrene-Butadiene-Styrene (SBS) block copolymer produce a small to medium improvement in physical properties (particularly softening point and penetration), especially at low temperatures. Cross-linking agents modify the macroscopic properties at low temperatures, making the asphalt more elastic, softer, easier to deform, and recover more readily from applied stress, while at the same time providing better resistance to deformation and recovery at high temperature as well. However, Rached warned that high concentrations of sulfur and the polymers (particularly above 12% by weight and particularly above 20% by weight) lead to over cross-linked gels with inconsistent properties and disastrous consequences.

Therefore, there exists a need for an improved modified bitumen production method and composition incorporating cross-linked tire rubber and polymers.

SUMMARY

An impact resistant shingle that includes a local polymer concentration ("LPC") asphalt shingle coating is described. The LPC asphalt shingle coating includes a saturated polymer ("SP") premix and a LPC premix blended and heated to between 320° F. and 500° F. for between 30 minutes and 240 minutes. The SP premix includes a bitumen feedstock and a cross-linking agent heated to between 320° F. and 500° F. and mixed for between 15 minutes and 60 minutes. The bitumen feedstock includes at least one of a bitumen and a rapid digestion process ("RDP") compound that includes one of: an unmodified RDP compound, a modified RDP compound, an enhanced RDP compound, and a modified enhanced RDP compound. The LPC premix includes an asphalt feedstock and a cross-linking polymer heated to between 320° F. and 500° F. and mixed for 1 minute to 60 minutes.

In some embodiments, the SP premix further includes a styrene ethylene butadiene styrene ("SEBS") viscosity modifying polymer that comprises between 4% and 8% of the SP premix.

In some embodiments, the cross-linking agent is a sulfur cross-linking agent, and the SP premix further includes a calcium stearate organic activator and a zinc oxide inorganic activator.

In some embodiments, the cross-linking agent is a peroxide coagent, and the SP premix further includes an organic activator.

In some embodiments, the RDP compounds include 1% to 70% tire rubber.

In some embodiments, the cross-linking polymer includes one of styrene butadiene styrene ("SBS") copolymer, styrene butadiene ("SB") copolymer, and a combination thereof.

In another embodiment, an impact resistant shingle is described. The impact resistant shingle includes a base material and a LPC asphalt shingle coating compound. The base material includes an upper and a lower surface. The LPC asphalt shingle coating compound includes a SP premix and a LPC premix blended and heated to between 320° F. and 500° F. for between 30 minutes and 240 minutes. The SP premix includes a bitumen feedstock and a cross-linking agent heated to between 320° F. and 500° F. and mixed for between 15 minutes and 60 minutes. The bitumen feedstock includes at least one of a bitumen and a RDP compound that includes one of: an unmodified RDP compound, a modified RDP compound, an enhanced RDP compound, and a modified enhanced RDP compound. The LPC premix includes an asphalt feedstock and a cross-linking polymer heated to between 320° F. and 500° F. and mixed for 1 minute to 60 minutes.

FIGURES

The present invention will be more fully understood by reference to the following drawings which are presented for illustrative, not limiting, purposes.

DESCRIPTION

Figure 1A:
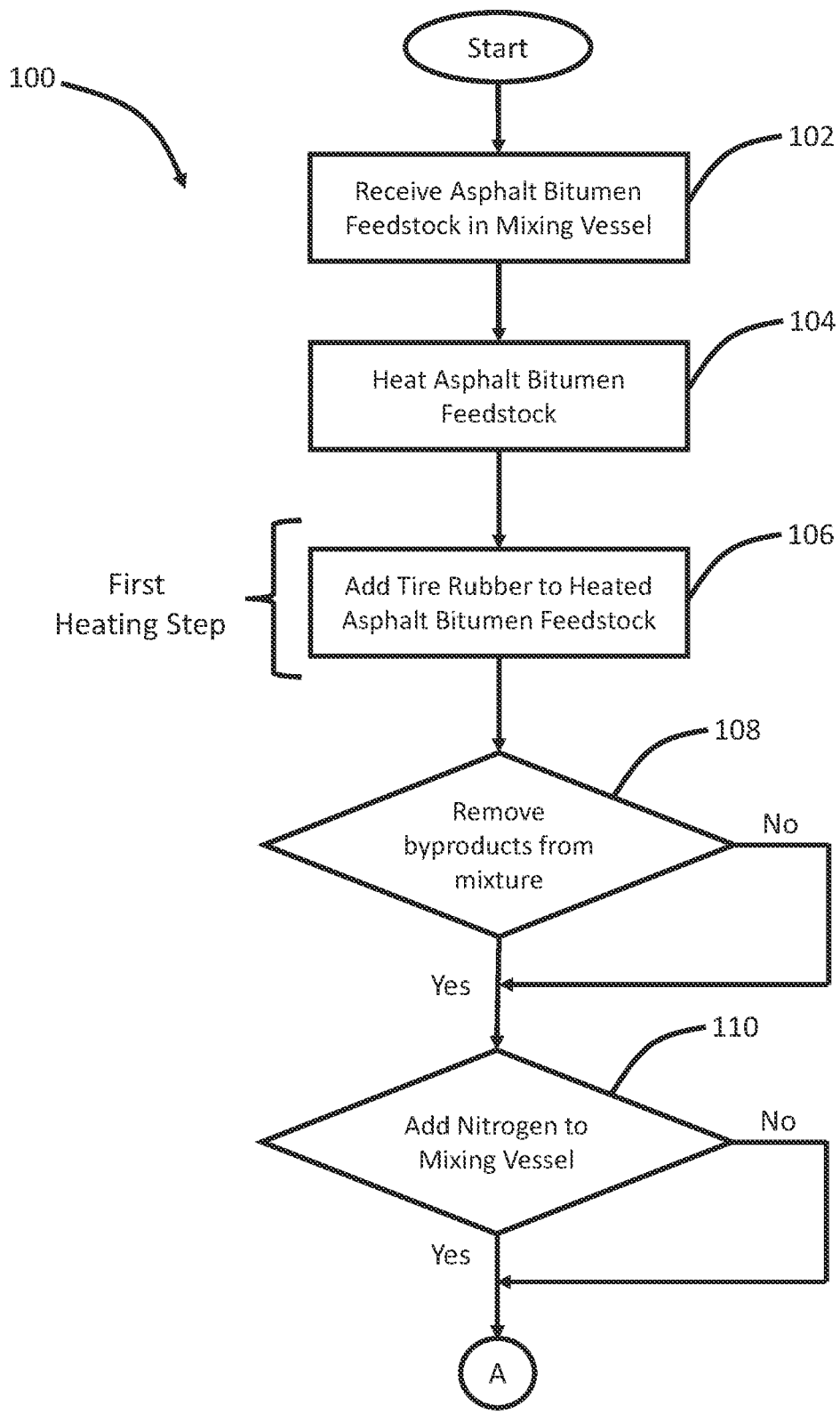
FIGS. 1A and 1B show a flow chart of a method for generating a rapid digestion process ("RDP") compound from tire rubber and an asphalt feedstock or an oil compound.

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the methods and compositions described herein may vary as to configuration and as to details. Additionally, the methods may vary as to details, order of the actions, or other variations without departing from the illustrative methods disclosed herein.

The inventors previously presented systems and methods of combining rubber and bitumen or oil in a process termed the Rapid Digestion Process ("RDP") to form products identified variously as "dissolved rubber compounds," "dissolved tire rubber bitumen compounds," and "tire rubber media," which are all generally referred to herein as "RDP products," or "RDP compounds." The RDP products comprise up to 70% rubber by weight, and the rubber may be ground tire rubber ("GTR"), scrap rubber, whole tires, or any combination thereof. These RDP systems and methods are described in inventors' prior application Ser. No. 15/283,821 (now U.S. Pat. No. 10,214,617), and Ser. No. 16/255,804 (now U.S. Pat. No. 10,843,966), as well as in the present application.

The inventors now present systems and methods of further processing the RDP products and incorporating the RDP products into bituminous asphalt applications, particularly roofing coatings, shingles, and combinations thereof. Inventors have found that the physical properties of the RDP products and the asphalt applications they are incorporated into or mixed with can be further improved with extended polymer networks or gels formed by local concentrations of Styrene Block Copolymers ("SBCs"), natural rubbers, and particularly Styrene-Butadiene-Styrene ("SBS") copolymers in bitumen materials. These concentrated polymer gels were thought to be disastrous by the prior art. But the inventors instead find that carefully controlled formation of polymer microstructures and/or macrostructures, i.e., localized polymer concentrations, provide especially optimal performance as an impact resistant shingle compound and/or coating when cross-linked and encapsulated by a bitumen solution or colloidal asphalt mixture. Inventors hypothesize that the cross-linked "gels" (localized polymer concentrations) contribute resistance flow properties to the resulting compounds incorporating the cross-linked "gels," termed Localized Polymer Concentrations ("LPC") compounds, LPC products, or LPC bitumen product. Carefully controlled sulfur or peroxide mediated cross-linking of the polymers creates localized polymer concentrations ("LPCs") that can be tailored in size to control the resulting physical properties of the LPC products and bituminous asphalt applications, such as viscosity and impact resistance. Strategic tailoring of the LPCs enables the formulation of coatings that when applied to shingle base materials yield Class 4 impact resistant shingle sheets with upper and lower parallel surfaces. The Class 4 impact resistant shingle sheets may be generated from a liquid application of the LPC product(s) to the upper surface of the base material, to the lower surface of the base material, or to both the upper and lower surfaces of the base material. Class 4 impact resistant products must withstand damaging hail impacts driven by high winds as specified by Underwriters Laboratory 2218 (UL 2218).

The systems, methods and compositions combine RDP products and bitumen (or modified bitumen/asphalt) at a high temperature to produce an improved bitumen mixture, i.e., the LPC bitumen compound or LPC product. The RDP product used to generate the LPC product includes a percentage by mass of "tire rubber," ranging from less than 1% up to 70%. The tire rubber comprising less than 1% up to 70% of the RDP product by mass may include, by way of example and not of limitation, GTR, scrap tire rubber, whole tires, other such tire rubber, and any combination thereof.

The systems, methods and compositions presented herein may be applied to asphalt road paving, asphalt bridge coating, hot mix asphalt, warm mix asphalt, cold mix asphalt, hot applied chip seal, applied emulsions, asphalt cutback, tack coats, pavement membranes, fog seal, bond coating, crack fillers, seal coats, thin overlay binders, micro-surfacing, pavement joint and caulking fillers, driveway fillers, and driveway sealers. In some embodiments, the systems, methods and compositions presented may be applied to roofing flux, roofing coatings, polymer modified roofing compounds, peel and stick compounds, waterproofing applications, pipe metal, concrete, and other coatings. Asphalt tack coats (hot applied, solvent, and emulsion based) are used to improve the adhesion between layers of asphalt pavement. The systems and methods presented herein further process dissolved tire rubber bitumen compounds, such as the RDP products, with local polymer concentrations or local polymer microstructures and/or macrostructures tailored to improve the physical impact resistance properties of the resulting LPC bitumen products.

The term "asphalt" is defined by the American Society for Testing and Material (ASTM) as a dark brown to black cementitious material solid or semi solid in consistency, in which the predominating constituents are bitumens which occur in nature as such or are obtained in residue in refining petroleum. More generally, the present compositions and methods described herein consider asphalt a colloidal system composed primarily of bitumen and aggregate.

The term "bitumen" refers to a generic term that according to the ASTM relates to a mixture of hydrocarbons of natural or pyrogenous origin, or a combination of both, frequently accompanied by their non-metallic derivates, which may be gaseous, liquid, semisolid, or solid and which are completely soluble in carbon disulphide. In commercial practice the term bitumen is used for the semisolid or solid bitumen which includes tars and pitches. Tars and pitches are obtained by destructive heat action on crude oil, coal and other organic materials. For the purposes of this disclosure, bitumen is understood to be composed of asphaltenes and maltenes, in contrast to some industry terminology that identifies asphalt, instead of bitumen, as being composed of asphaltenes and maltenes. The relative amounts of asphaltenes and maltenes in the bitumen determine the physical and chemical behavior of any given asphalt derived therefrom.

The term "asphaltene(s)" refers to the portion of bitumen that is naphtha insoluble, so that in an excess of naphtha the asphaltenes remain insoluble. The asphaltenes may represent up to 50% of bitumen, in which a major portion of total Oxygen, Nitrogen, Sulfur, Nickel and Vanadium are concentrated. Asphaltenes are brown to black amorphous solids. Asphaltenes have carbon/hydrogen ratios of 0.81-1.00 which indicates they are aromatic in nature. Their molecular weight ranges from 500-7000 Daltons ("Da").

The term "maltene" refers to the naphtha soluble portion of bitumen. The maltene fraction is free of asphaltenes and carbenes. The maltene carbon/hydrogen ratio is in the range of 0.6-0.75 which indicates that the molecular structure includes aliphatic chains or saturated rings. The maltene fraction includes resins and oils. The molecular weights are in the range of 500-1500 Da.

The term "resins" refers to cyclic aromatic compounds.

The term "oils" refers to saturated hydrocarbons having appreciable wax content.

The term "carbenes" refers to the highest carbon content fraction of bitumen. Carbenes are insoluble in carbon tetrachloride. Carbenes, if present, occur in trace amounts.

The term "asphalt feedstock" is used interchangeably with the term "bitumen," "asphalt bitumen," and "asphalt bitumen feedstock."

The term "penetration" refers to the depth a standard steel needle with a truncated cone penetrates a properly prepared sample of bitumen. Penetration is related to hardness or consistency of the bitumen or any asphalt derived therefrom. The apparatus which permits the needle holder to move vertically without friction and measures the depth of penetration to the nearest 0.1 mm is known as penetrometer. The distance that the needle penetrates in units of tenths of a millimeter is the penetration value. The weight of the needle is 50 g and another 50 g weight is placed on the needle, which results in a 100 g weight. The needle is slowly lowered onto a sample until it just makes contact with the surface of the sample. The dial of the penetrometer is adjusted to zero and the needle is released quickly for the specified period of five seconds and the distance penetrated is measured.

The term "softening point" refers to a measure of temperature in which a steel ball passes through a ring that includes the bitumen sample and falls a distance of 2.54 cm, when the specimen, ball and bath of water/glycerin are heating at a specified rate. A steel ball, 9.54 mm in diameter, is placed in a ball centering guide.

The term "viscosity" refers to the viscosity determination of bitumen or any asphalt derived therefrom at elevated temperatures using a rotational viscometer as described in ASTM D4402, which is hereby incorporated by reference.

The term "mass loss" refers to the amount of volatile compounds that escape a bitumen or asphalt composition derived therefrom over time. Mass loss is measured as the percent of the initial mass lost, i.e. $m_l = 100 \times (m_i - m_f)/m_i$, where "$m_l$" is the mass loss, "$m_i$" is the initial mass, and "$m_f$" is the mass after a measurement time. This metric is useful for simulating asphalt binder aging, and is standardized under AASHTO T240 and ASTM D2872, which describe a rolling thin film oven procedure for exposing asphalt binders to high temperatures to simulate binder aging.

The term "volatile organic compound" ("VOC") refers to a broad group of non-methane hydrocarbons that encompass organic chemicals having a high vapor pressure at room temperature, i.e., a low boiling point. With respect to bitumen (or asphalt) VOC emission, VOCs are typically petroleum derived and can include, but are not limited to, acetone, ethanol, trimethylbenzene, toluene, butanone, isopropyl alcohol, benzene, dichloromethane, ethylacetate, heptane, ethylbenzene, xylene, benzo pyrene, anthracene, naphthalene, acridines, pyridines, and phenols.

The term "Styrenic Block Copolymer" or "SBC" refers to a large category of thermoplastic elastomers. SBCs possess the mechanical properties of rubbers, and the processing characteristics of thermoplastics. There are two broad classes of SBCs contemplated by this application: saturated and unsaturated. The saturated SBCs have a saturated alkyl backbone linking the styrenic blocks together, while the unsaturated SBCs have an unsaturated or poly-unsaturated backbone linking the styrenic blocks together. There are six major types of SBCs contemplated by this application, Styrene-Butadiene ("SB"), Styrene-Butadiene-Styrene ("SBS") block polymers, Styrene-isoprene-styrene ("SIS") block copolymers, Styrene-Ethylene copolymers ("SEC"), Styrene-Ethylene-Butylene-Styrene ("SEBS"), and hydrogenated styrenic block copolymers ("HSBC"). SB, SBS, and SIS are unsaturated, containing at least one Carbon-Carbon double bond ("C=C") along their carbon backbone of the mid-block linking the styrenic end-blocks together. The HSBCs, SEC, and SEBS are saturated, having a saturated alkyl backbone of the mid-block linking the styrenic end-blocks together. Since the saturated backbone lacks any C=C bonds, or Carbon-Carbon triple bonds, it contains only C—C bonds and Carbon-Hydrogen bonds ("C—H"). In some embodiments, the SBS is radial.

The SBCs can be branched, linear, diblock, triblock, tetrablock, or multiblock. In some embodiments, the SBC has the general formulae S—B—S(I), or $(S-B)_n$—X (II), and may contain varying amounts of diblock S—B (III) up to 100%. In these formulae, each S independently is a poly(vinyl aromatic), and each B independently is: (1) a saturated alkyl chain or cycloalkyl block, (2) an unsaturated alkylene or cycloalkylene block, or (3) an unsaturated alkyne or cycloalkyne block, n is an integer equal to or greater than 2, and X is the residue of a coupling agent, where the coupling agent can be any di- or polyfunctional coupling agent known in the art.

An exemplary vinyl aromatic monomer is styrene. In some embodiments, the styrene moiety forming the SBCs are substantially pure monomers or a major component in mixtures with minor proportions of other structurally related vinyl aromatic monomer(s), such as o-methylstyrene, p-methylstyrene, p-tert-butylstyrene, 2,4-dimethylstyrene, α-methylstyrene, vinylnaphtalene, vinyltoluene and vinylxylene. Similarly, in some embodiments, the alkyl, cycloalkyl, alkylene, cycloalkylene, alkyne, or cycloalkyne moiety forming the SBC are substantially pure monomers or can contain minor proportions of structurally related alkyls, cycloalkyls, alkylenes, cycloalkylenes, alkynes, or cycloalkynes.

In one embodiment, the unsaturated SBCs comprise at least two polymer blocks. At least one of those at least two polymer blocks is substantially made of an aromatic vinyl compound and at least one other of the at least two polymer blocks is substantially made of a conjugated diene compound.

In another embodiment, the saturated SBCs comprise three polymer blocks. One of those three polymer blocks is substantially made of an aromatic vinyl compound, one of the polymer blocks is substantially made of a monoene chain compound, and another of the polymer blocks is substantially made of a second monoene chain compound.

The term "neutral gas" refers to non-reactive gases or non-oxygenated gases, such as, but not limited to, argon (Ar), carbon dioxide ($CO_2$), helium (He), neon (Ne), and nitrogen ($N_2$).

The term "cross-linking polymer" refers to polymers with repeating C=C double bonds along the carbon backbone or in side chain groups, which polymers may comprise an olefinic elastomer; olefinic vinyl acetate; block copolymers, such as SBS, SB, SIS; thermoplastic vulcanizate; polyurethane; copolyester; polyester; polyamide; or any combination thereof.

The term "localized polymer concentration" refers to gelatinous bodies of cross-linked cross-linking polymers suspended in bitumen compositions.

Method for Preparing RDP Product

Figure 1B:
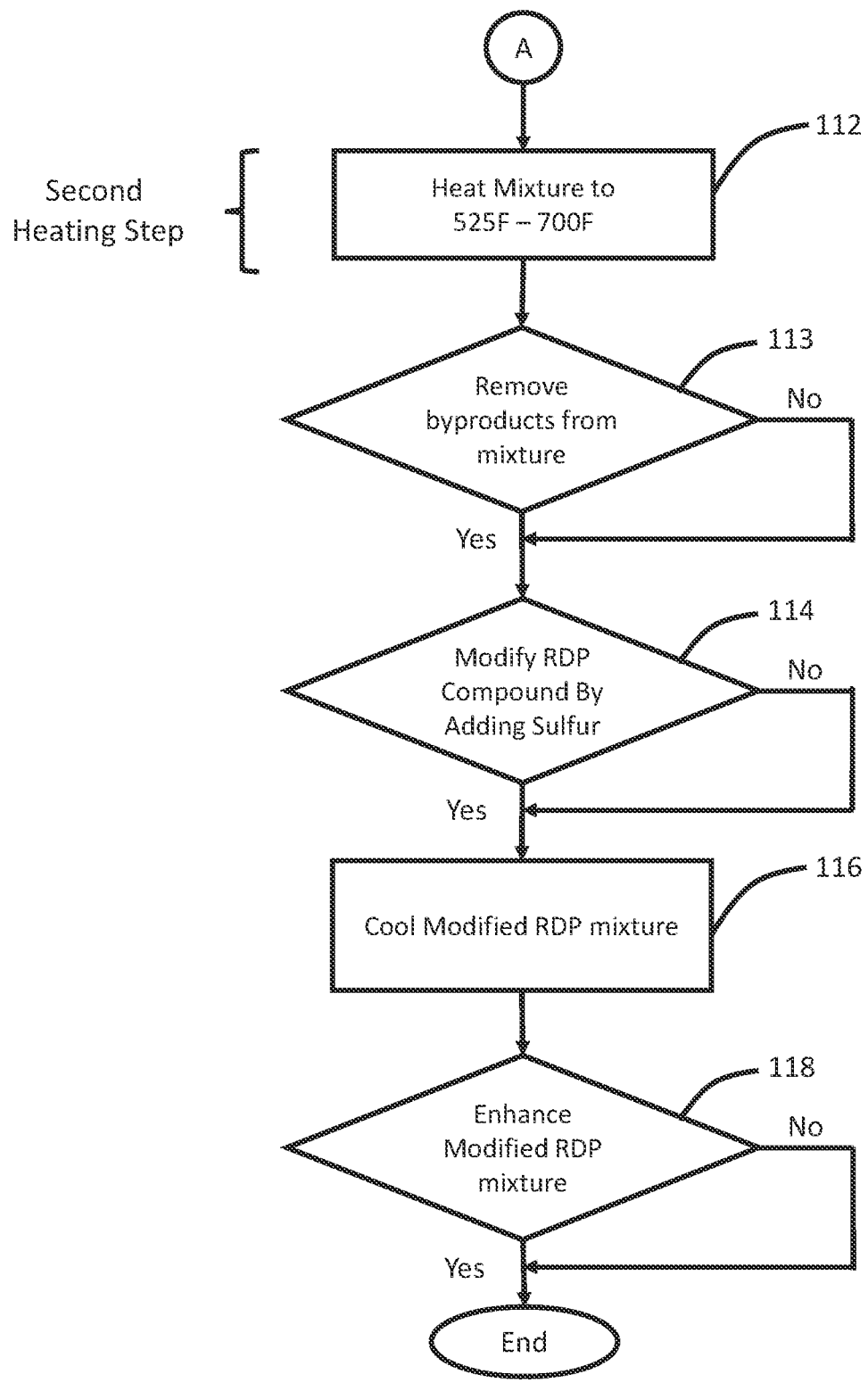

Referring to FIGS. 1A and 1B, there is shown an illustrative method 100 for dissolving tire rubber in bitumen, known generally as the rapid digestion process ("RDP"). The RDP method presented herein includes exposing the tire rubber to temperatures exceeding 525° F. for periods of 6 hours or less causing the tire rubber to release process oils embedded within the tire rubber into the bitumen.

While most processes require that the vulcanized rubber such as tires be ground to remove the bias and steel ply, adding substantial cost to the preparation of the material, the illustrative method 100 shown in FIG. 1 supports utilization of entire tires or partially cut tire scraps without further processing to remove the bias, steel, or plies embedded within a typical vehicle tire. The rubber is placed into a bath of oil or asphalt feedstock in a reaction vessel (shown below in FIG. 2 as reference 222). The rubber and bitumen mixture is then heated and stirred to provide uniform heat distribution. The tire rubber may include whole tires, scrap tire rubber, tire rubber chunks, tire rubber scraps, shredded tires, cut or partially cut tires, other such tire rubber, or any combination thereof.

In another embodiment, at least some of the asphalt feedstock includes Trinidad Lake Asphalt, which is a thermoplastic material. The Trinidad Lake Asphalt may act as a carrier for the tire rubber directly into the reactor mixing vessel.

The method is initiated at block 102 where an asphalt feedstock is selected and received in the reactor mixing vessel. By way of example and not of limitation, the illustrative asphalt feedstock has a penetration of 135 dmm @ 77° F. In an alternative embodiment, an oil compound may be substituted for the asphalt feedstock. Note, the method 100 may use only asphalt feedstock, only oil, or a combination of asphalt feedstock and oil. For purposes of this patent, the term "asphalt feedstock" generally refers to the application of bitumen/asphalt feedstock, oil, and the combination of asphalt feedstock and oil.

The method then proceeds to block 104, in which the asphalt feedstock is heated to between 320° F. to 420° F.

At block 106, tire rubber is added to the heated asphalt feedstock and stirred. This is a first heating and mixing step. By way of example and not of limitation, a preliminary mixing process is initiated in the reactor mixing vessel, where the tire rubber is combined with the asphalt feedstock and heated to between 320° F. to 420° F. to effectively disperse the tire rubber uniformly into the asphalt feedstock. This first heating and mixing step generates a "first" processed asphalt feedstock/tire rubber mixture.

In a broad illustrative embodiment, up to 70% by weight of tire rubber is added to the heated asphalt feedstock. In a narrower illustrative embodiment, 5% to 50% by weight of tire rubber is added to the heated asphalt feedstock. In an even narrower illustrative embodiment, 7% to 30% by weight of tire rubber is added to the heated asphalt feedstock. In embodiments utilizing 50% or more tire rubber, the tire rubber is added to bitumen with stirring to obtain even heat distribution.

At decision diamond 108, after the vulcanized rubber, oil, and carbon black are released from the tire ply into the liquid medium of the oil compound or bitumen a determination is made whether to remove byproducts from the first processed asphalt feedstock/tire rubber mixture. When it is determined to remove the byproducts, the dissolved material that is the liquid medium (i.e., the first processed asphalt feedstock/tire rubber mixture) is then drained from the mixing vessel leaving the ply material, steel belting, steel wire, and generally insoluble byproducts behind. The byproducts are then removed and washed with a suitable solvent to remove excess dissolved material (the first processed asphalt feedstock/tire rubber mixture) from the ply, belts, and other byproducts. The removal may be performed by a separator within the mixing vessel. The separator may be a sieve or a grate configured to allow dissolved material (oil/bitumen), and dissolved tire rubber to pass through while stopping or retaining undissolved byproducts. In some embodiments, a magnet is used to remove the steel belts, which can then be recycled. The separated metallic alloy or steel waste material can then be subjected to pyrolytic heating to further remove tire rubber, asphalt, and/or oil.

At decision diamond 110, a determination is made whether to add Nitrogen or other non-oxygenated gas to the mixing chamber. The application of Nitrogen to the mixing chamber ensures that there is little or no oxidation of the first processed asphalt feedstock/tire rubber mixture. The use of a Nitrogen blanket or other non-oxygenated gas excludes air and oxygen from the reactor environment by displacing air and oxygen from the headspace above the first processed asphalt feedstock/tire rubber mixture. However, there may be circumstances where some oxidation is necessary and thus some air or oxygen enters the reactor environment. In another illustrative embodiment, the mixing chamber has some air, but is surrounded by an inert atmosphere so there is minimal oxidation.

In operation, Nitrogen ($N_2$) is added to the top of the reactor, i.e. mixing vessel, to provide a low pressure sweep in the headspace of the mixing vessel to remove air and prevent oxygen entrapment in the first processed asphalt bitumen feedstock/tire rubber mixture. Additionally, Nitrogen may also be introduced from the bottom of the reactor. In certain embodiments, Nitrogen may be introduced in the headspace and the bottom of the mixing vessel.

Generally, the mixing vessel is purged and then swept to remove oxygen from the headspace of the vessel. The purge may be performed by vacuuming the mixing vessel headspace during a second heating process described below in block 112 that generates a second processed asphalt feedstock/tire rubber compound. This purge may include flushing the vacuumed headspace with nitrogen or other non-oxygenated gas after the second heating process described below in block 112. The use of a Nitrogen blanket or other non-oxygenated gas excludes oxygen from the reactor environment by displacing any remaining oxygen from the headspace above the first processed asphalt feedstock/tire rubber mixture. In some embodiments, no vacuuming may be performed, and instead the headspace may simply be flooded with Nitrogen, non-oxygenated gas, or a combination thereof to displace oxygen from the headspace. Removal of oxygen prevents oxidation at temperatures approaching or even exceeding the lowest flash point of the mixture components, and prevents autoignition at processing temperatures up to 700° F.

At block 112, the first processed asphalt bitumen feedstock/tire rubber mixture undergoes a second heating process where the mixture is heated to between 525° F.-700° F.

in the illustrative mixing vessel, which is also interchangeably referred to as a "reactor" or "reaction vessel," for between 5 minutes to 360 minutes with mixing. In a narrower illustrative embodiment, upon adding the tire rubber to the asphalt feedstock the resulting first processed asphalt feedstock/tire rubber mixture is heated to 575° F.-625° F. In another narrower illustrative embodiment, the first processed tire rubber and bitumen mixture is heated to 600° F.-650° F. In an even narrower illustrative embodiment, the first processed tire rubber and bitumen mixture is heated to 590° F.-610° F.

In some embodiments, during this second heating and stirring process the steel completely separates from the tire rubber, and the decomposed tire rubber, process oils, carbon black, mineral fibers, and even some or all of the polyester fabrics become fully incorporated into the bitumen to generate a RDP compound. The steel physically separates from the tire rubber prior to the tire rubber's dissolution into the asphalt feedstock/oil due to the difference in the thermal expansion rate between steel and rubber. In these embodiments, the byproducts were not removed after or during the initial heating and mixing, but instead remained within the first processed asphalt feedstock/tire rubber mixture. In these embodiments, the byproducts are removed and washed with a suitable solvent to remove excess tire rubber, bitumen, and/or RDP compound from the ply and belts after heating to 525° F.-700° F. for between 5 minutes to 360 minutes. In a narrower illustrative embodiment, the first processed asphalt feedstock and tire rubber mixture are mixed for between 5 minutes to 60 minutes. In one illustrative embodiment, the mixing vessel includes a circulating pump that uniformly mixes the first processed asphalt/tire rubber mixture in the mixing vessel during the second heating process. In another illustrative embodiment, a stirrer or agitator is used within the mixing vessel.

The uniform mixing process avoids hot spots within the reaction vessel, i.e. mixing chamber. Additionally, the uniform mixing produces an even heating rate as the first processed asphalt feedstock/tire rubber mixture is raised from between 320° F. to 420° F. to between 525° F. to 700° F. in the mixing vessel.

After the second heating step at block 112, the first processed asphalt feedstock/tire rubber mixture is converted to a dissolved tire rubber bitumen mixture or unmodified RDP compound. The dissolved tire rubber bitumen mixture may be a final dissolved tire rubber bitumen compound or unmodified RDP bitumen product. However, additional processing may be performed to produce a further modified dissolved or solubilized tire rubber bitumen compound as described in further detail below. Although the resulting compound after the second heating step in block 112 is generally referred to as the "dissolved tire rubber compound," the product of this second heating step may also be characterized as an RDP product or a solubilized rubber compound, which may be enhance or modified as described herein.

The RDP product is generated after heating to approximately 525° F.-700° F. in the reaction mixing vessel. The RDP product may in some instances also be the final RDP product described in U.S. Pat. No. 10,843,966.

At decision diamond 113, a determination is made whether to remove byproducts from the RDP product. Byproducts are only removed from the dissolved tire rubber bitumen compound when the byproducts were not removed earlier at decision diamond 108. When byproducts are present in the RDP product and a determination is made to remove those byproducts in decision diamond 113, either the RDP product is removed from the byproducts, or the byproducts are removed from the RDP product. Thus, the RDP product may be drained from the mixing vessel, leaving the ply material, steel belting, steel wire, and insoluble byproducts behind in the mixing vessel. Alternatively, a separator within the mixing vessel allows the RDP product to pass through while stopping or retaining the undissolved byproducts. In both cases, the byproducts are removed and washed with a suitable solvent to remove excess dissolved material (i.e., the dissolved tire rubber bitumen RDP compound) from the ply, belts, and other byproducts. The separated metallic alloy or steel waste material can then be subjected to pyrolytic heating to further remove tire rubber, bitumen, and/or oil.

At decision diamond 114, a determination is made whether to add sulfur to the reactor vessel to cross-link the various polymers, rubbers, and oils of the RDP product to generate a "modified" RDP product. The cross-links comprise Sulfur-Carbon ("S—C") bonds and/or Carbon-Carbon ("C—C") bonds between the various polymers, rubbers, and oils of the RDP product.

The inventors hypothesize that this cross-linking has the effect of preventing the fragmentation and degradation of natural rubber and polymers dissolved therein, as well as incorporating volatile organic compounds ("VOCs") into the polymers and natural rubber of the resulting modified RDP product. These crosslinks may be between one polymer and another polymer, between one rubber compound and another rubber compound, between one oil and another oil, between a polymer and a rubber, between a polymer and an oil, between a rubber and an oil, and between a polymer, a rubber compound, or an oil and a VOC. Together, these cross-linking operations reduce the mass loss of the resulting modified RDP product by cross-linking VOCs to one another, polymer additives, and components of the bitumen and tire rubber comprising the modified RDP product. VOCs may autoignite under the high operating temperatures of the rapid digestion process, and are less able to do so when cross-linked, such as by sulfur. Thus, removal and/or reduction of accumulated VOCs creates a much safer workplace. The reduction in mass loss causes a corresponding increase in the flash point and thereby produces a more stable modified RDP product through a safer process as a result of VOC incorporation. In one embodiment, the sulfur may be added after an additional application of vacuum to the headspace, removing a majority of VOCs from that headspace.

In a further embodiment, vacuum may be applied to the headspace after addition of the sulfur. The application of vacuum may be performed once or in repeated cycles interspersed by flushing the headspace with nitrogen, a non-oxygenated gas, or a combination thereof. Each of these additional applications of vacuum reduce the amount of VOCs present in the reactor and therefore present in the modified RDP product.

In another embodiment, sulfur is added to the reactor before block 112 to the first processed asphalt feedstock/tire rubber mixture. This earlier addition of sulfur allows for VOCs, portions of the tire rubber components, asphalt, and polymer additives to begin cross-linking prior to exposure to the operating temperature of 525° F.-700° F. in the reactor. The product resulting from addition of sulfur at this earlier stage of the method 100 is termed the "modified" first processed bitumen/tire rubber mixture. Inventors hypothesize that this "preventative" cross-linking reduces the occurrence of fragmentation, the generation of VOCs, the total amount of VOCs emitted from the modified first processed asphalt feedstock/tire rubber mixture during preparation, and the mass loss of the RDP product resulting from the second heating process at block 112. As with later additions of sulfur, the RDP product resulting from the second heating process at block 112 of the modified first processed asphalt feedstock/tire rubber mixture is termed the "modified" RDP compound.

Mass loss is an important challenge to overcome for dissolved tire rubber bitumen compounds, as the tire rubbers comprise a greater concentration of low boiling point compounds than bitumen generally. As such, the more tire rubber that is added to bitumen to produce the first processed asphalt feedstock/tire rubber mixture, the RDP product, and/or their "modified" versions, the greater the mass loss of the resulting RDP compounds. Importantly, a key indicator of binder aging is the loss of smaller molecules (such as, but not limited to, VOCs) that improve a bitumen compound's viscosity. As the amount of mass loss increases, asphalt binders age and become less viscous. Additionally, since mass loss is attributed to the loss of smaller molecules, the flashpoint of compounds with high mass loss is much lower than compounds with low mass loss. Most applicable regulatory agencies require asphalt paving compounds to have mass loss of 1% or less as determined by the RTFO test described in AASHTO T240 and ASTM D2872. Thus, RDP compounds having greater than 1% mass loss may not be commercially useful for any paving applications due to regulatory concerns. However, the addition of sulfur as a cross-linking reduces mass loss concerns by trapping these smaller molecules within the polymer network of the modified RDP compounds.

The added sulfur may be any type of elemental sulfur, such as cyclic $S_6$, $S_7$, $S_8$, $S_{12}$, $S_{18}$, rhombic sulfur (Sa), monoclinic sulfur (SR); amorphous ("plastic") sulfur; polycationic sulfur, such as $S_8^{2+}$, $S_4^{2+}$, $S_{16}^{2+}$, which may be a sulfur salt with a suitable anion; anionic sulfur salts, such as $Na_2S_8$; and any other commercially available sulfur source. Further, the added sulfur may be in the form of a powder, a slurry, or molten.

The resulting modified or unmodified dissolved tire rubber bitumen compound (i.e., the RDP product) is then cooled to 400° F. to 500° F., or as low as 350° F. at block 116. In some embodiments, the bitumen/tire rubber mixture is quenched with an addition of bitumen, which cools the bitumen/tire rubber mixture from 600° F. to 500° F. or less. In other embodiments, the resulting RDP compound is cooled to 50° F. below the Cleveland Open Cup ("COC") flash point of the RDP compound. In some embodiments, the resulting (modified or unmodified) RDP compound can be cooled through a second addition of unheated or lower temperature asphalt feedstock or oil compound that quenches the dissolved tire rubber bitumen compound. In still other illustrative embodiments, water may be used to cool down the dissolved tire rubber bitumen compound to 500° F. or less. In another embodiment, the RDP compound is cooled by a heat exchanger.

After cooling, in embodiments where the byproducts were not removed earlier, the (modified or unmodified) dissolved tire rubber bitumen compound is decanted from the steel belting and other byproducts remaining in the dissolved tire rubber bitumen compound. The decanted steel byproducts can then be subjected to pyrolytic heating to clean the steel byproducts. In some embodiments where the byproducts were removed earlier, the cooled dissolved tire rubber bitumen compound is transferred to a storage vessel or processing vessel. The RDP compound may undergo further modification in the processing vessel. The storage vessel may be metal, and particularly of a stainless steel construction. The storage vessel may be open to atmosphere or enclosed, and while such enclosure need not be air tight, it may be a chamber sealed from external atmosphere.

In an alternative embodiment, the sulfur added at block 114 may instead be added after the cooling step of block 116, when the dissolved tire rubber bitumen mixture has been cooled below the flash point of the mixture to generate the modified dissolved tire rubber bitumen mixture.

The resulting sulfur cross-linked mixture is referred to as the "modified RDP compound." The resulting modified dissolved tire rubber and asphalt feedstock mixture experiences a significant increase of measured penetration depth at 77° F. over the original bitumen or asphalt feedstock while minimizing the oxidation and aging reactions associated with exposure of bitumen to high temperatures.

At block 118, the method may proceed to enhance the resulting (modified or unmodified) RDP product by addition of a wide range of polymers such as styrenic block copolymers ("SBCs"), olefinic elastomers, olefinic vinyl acetates, natural rubber, and various agents that emulsify the composition. The resulting RDP compound is termed "enhanced," i.e., enhanced modified RDP compound or enhanced unmodified RDP compound.

The use of polymers treated with various oils, asphalt flux, or plasticizers prior to mixing with the dissolved tire rubber bitumen compound allows for the incorporation of high molecular weight polymers at relatively low quantities that enhance both the flexibility and elasticity of the dissolved tire rubber bitumen compound. Also, common emulsification agents and reagents can be used to adjust pH for the production of either cationic or anion emulsions.

In some embodiments, SBCs are added to the (modified or unmodified) RDP compound at block 118. In one embodiment, SBCs are added to the first processed asphalt feedstock/tire rubber mixture prior to the second heating process. In another embodiment, SBCs are added to the first processed asphalt feedstock/tire rubber mixture during the second heating process. In still another embodiment, SBCs are added to the RDP compound after the second heating process. In some embodiments, the SBCs include SEBS. Examples of a particular type of SBC enhancement through creation of localized polymer concentrations in a bituminous RDP compound are described further below, and generally termed the "LPC process."

In one embodiment, the byproducts remaining in the RDP compound include materials having a flashpoint in the range of fuel oil. A significant portion of the byproduct materials having a flashpoint in the range of fuel oil are collected in a knock out drum, a scrubber, a vacuum unit, or other separation device. The knock out drum uses the collected fuel oil byproduct to seal the head space of the reaction vessel from oxygen. The byproduct waste oil accumulates and overflows into a collection tank, and can then be harvested for sale or cleaned for use as a fuel source to supplement fuel used in the dissolved tire rubber bitumen compound production processes.

In still another embodiment, the reaction vessel or mixing vessel applies a vacuum to the head space after reaching 600° F. for a period of at least 1 hour. The 1 hour time period allows lighter weight materials to separate from the tire rubber and/or asphalt feedstock and enter the gaseous phase occupying the headspace of the mixing vessel. Upon entering the headspace, the lighter weight materials may be removed by application of the vacuum. The lighter weight materials may include diesel fuels and VOCs. This embodiment increases the flash point of the dissolved tire rubber bitumen product to between 450° F. to 550° F. under vacuum.

The (modified or unmodified, enhanced or unenhanced) tire rubber bitumen RDP product resulting from method 100 may then be used in the wide range of applications that employ bitumen, including further LPC enhancement as described below.

The inventors hypothesize that the heated tire rubber releases process oils from the tire rubber into the maltene fraction of the bitumen, which improves both the oxidation resistance and ductility properties of the resulting RDP compounds.

Additionally, the inventors hypothesize that the bitumen (asphalt) is actually rejuvenated by the increase of the maltene to asphaltene fraction as observed when processing bitumen with vulcanized rubber, i.e., the RDP compound.

The inventors also hypothesize that the Sulfur-Carbon ("S—C") bonds are easier to break than the Carbon-Carbon ("C—C") bonds. As a result, the heating processes described herein "devulcanizes" the rubber by removing the cross-linking caused by the S—C bonds between the polymer chains having C—C bonds. The result is the more soluble polymers, i.e. oils with C—C bonds, are dissolved in the mixing vessel. In some embodiments, this dissolution of soluble polymers occurs prior to increasing the temperature in the reaction vessel to 525° F.-700° F. for the second heating process.

This hypothesis is supported by the finding that the addition and dissolution of tire rubber reduces the flash point of the bitumen starting material. For example, an original bitumen flux COC flash point was 687° F. After incorporation of 20% scrap tire rubber at 600° F. for 30 minutes, the COC flash point of the RDP compound dropped to 608° F. This drop in flash point is caused by more soluble oils being released from the tire rubber. The process oils used to manufacture tires have flash points ranging from 400° F.-500° F., thus the flash point would be reduced when the oils are released from their fixated state in the scrap tire rubber.

Furthermore, similar to the recent use of saponification agents, such as stearamides and phosphates, in bitumen, saponification agents can be added to the resulting (modified or unmodified, enhanced or unenhanced) RDP compound to adjust the properties of softening point and penetration depth while allowing good viscosity control as needed. The RDP compound may also be combined with saturated fabrics such as fiberglass, polyester, rayon, nylon, or combinations thereof in various applications, such as paving, roofing, mining liners, and waterproofing. Further still the RDP compound may be used in drilling fluid applications to improve the viscosity curve of bitumen, thereby expanding the range of formulation options available to a drill fluid chemist.

Further still, the use of GTR and other vulcanized rubber containing carbon black enhances the black color of the RDP compound. This enhancement in addition to the improved weathering commonly associated with carbon black, allows the paving produced with RDP compounds to yield a long lasting high contrast surface for traffic marking that greatly improves both day and nighttime visibility. Additionally, in roofing applications, the carbon black stabilizes the roof coating, improving weathering resistance, and provides a deep black uniform surface for enhanced appearance of various blended and single color granule applications.

RDP System for Dissolving Tire Rubber

Figure 2:
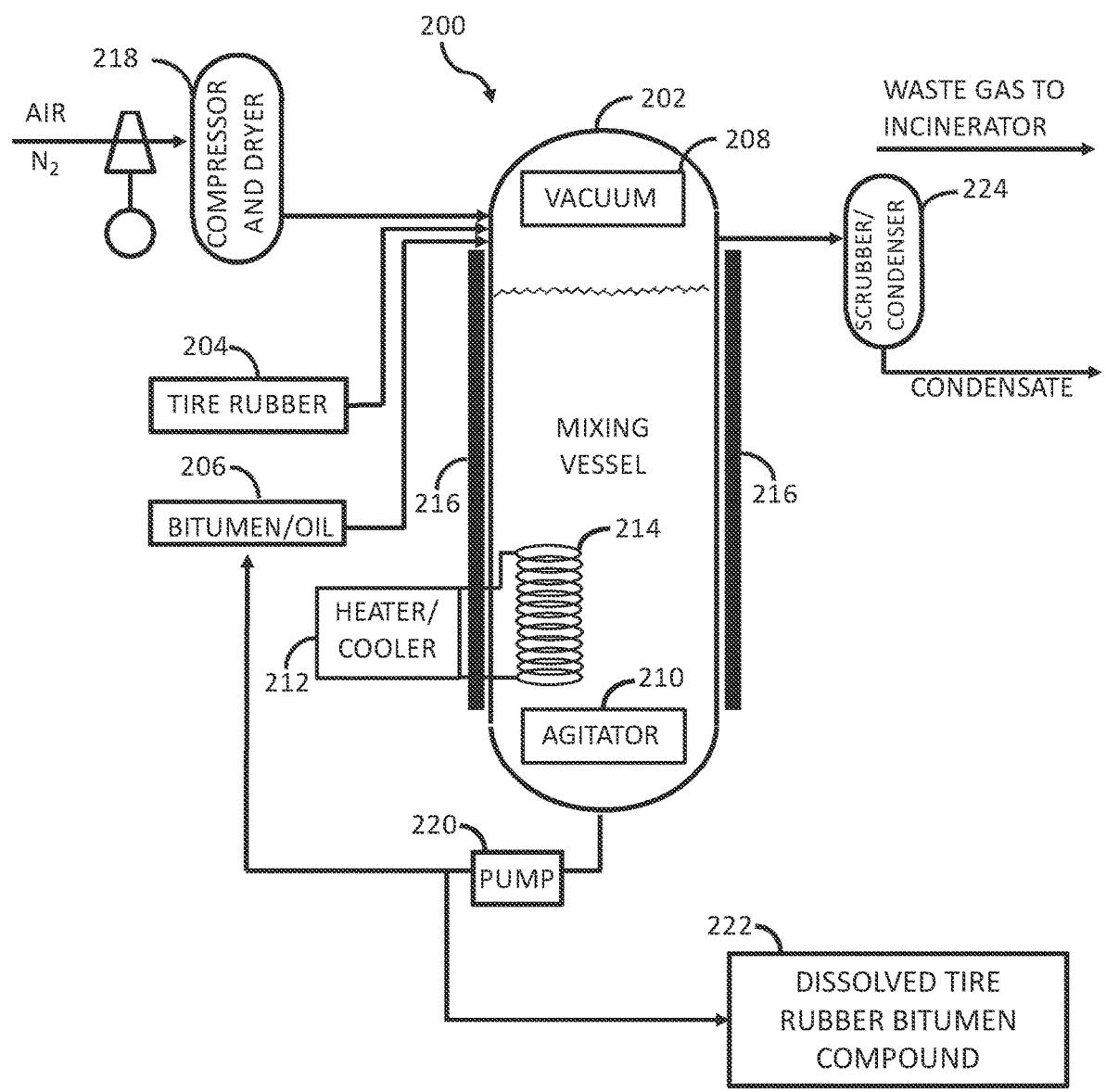
FIG. 2 shows an illustrative reaction system for the rapid digestion process.

Referring now to FIG. 2 there is shown a system 200 that controls a process that dissolves tire rubber in bitumen or oil. The illustrative system 200 includes an integrated reactor 202, i.e., mixing vessel, that receives tire rubber 204 and an asphalt feedstock or an oil compound 206. The integrated reactor 202 has an exterior surrounding an interior space that receives the rubber and bitumen. By integrating various components and control elements into the mixing vessel 202, external attachment points and couplings are minimized and the integrity of the mixing vessel 202 is maximized. This maximized integrity allows the integrated mixing vessel 202 more reliably withstand greater temperatures and pressures, as well as achieve higher degrees of vacuum and lower levels of oxygen more efficiently. The higher degrees of vacuum and lower levels of oxygen are achieved because the mixing vessel 202 is configured to be sealed from the exterior atmosphere and includes a vacuum unit 208. The vacuum unit 208 may be mounted within the interior reactor space, mounted to the exterior surface of the mixing vessel 202, or affixed to an external location and connected to the interior reactor space. The vacuum 208 is particularly configured to remove oxygen and other gases from the interior reactor space.

The integrated reactor 202 performs preliminary mixing with an internal agitator 210 and a first heating process with a heating element that heats the tire rubber 204 and the bitumen/oil 206 to between 375° F. to 400° F. with a temperature controller 212 (i.e., heater/cooler unit) to generate the first processed asphalt feedstock/tire rubber mixture. The tire rubber 204 may be unprocessed or relatively unprocessed and include undesirable byproducts, such as steel belts, fabric ply, metallic alloys, steel waste, and other non-rubber components of tires. Removal of these byproducts from the tire rubber and bitumen mixture or from the RDP product may be performed by a separator (not shown) within the mixing vessel 202. The separator may be a sieve, or a grate configured to allow dissolved material (i.e., oil, bitumen, and/or dissolved rubber) to pass through while stopping or retaining undissolved byproducts. In some embodiments, a magnet is used to remove the steel belts, which can then be recycled. The separated metallic alloy or steel waste material can then be subjected to pyrolytic heating to further remove bitumen or oil.

The heater/cooler element 212 includes heating/cooling coils 214 inside the integrated reactor 202 and a heating/cooling jacket 216 surrounding some or all of the exterior of the integrated reactor 202. The heating/cooling element 212 cycles a fluid, such as an oil, through the heating/cooling coils 214 and/or heating/cooling jacket 216 at a desired temperature to both heat and cool the contents of the integrated reactor 202. The agitator 210 may be an impeller, a rotor stator, an anchor (i.e., sweep blade), a planetary mixer, or other stirring implement, and any combination thereof located within the interior reactor space of the integrated reactor 202. The agitator 210 mixes and/or circulates the contents of the integrated reactor 202, i.e., the bitumen compound, the oil compound, the rubber, the RDP product, the modified RDP product, the enhanced RDP product, or any combination thereof.

The integrated reactor (mixing vessel) 202 receives the mixture of tire rubber and asphalt feedstock or oil compound, which is filled to the desired operating level, e.g., 65% to 75% of the column height.

The illustrative reactor 202 is a vertical vessel equipped with a gas distribution component 218, which may have a feeder at the top and bottom of the vessel 202, allowing access through separate feeder ports. The gas distribution component 218 may include a compressor to transfer, supply, and/or pressurize the gases to be distributed to the interior reactor space. The gas distribution component 218 may also include a dryer that removes moisture and other contaminants from the gases to be distributed. The gas distribution component 218 may receive Nitrogen ($N_2$), a non-oxygenated gas, air or any other such gas. In one illustrative embodiment, $N_2$ is added to the top of the mixing vessel 202 to provide a low pressure sweep in the headspace of the mixing vessel 202 to remove the air and prevent oxygen entrapment in the bitumen/tire rubber mixture before, during, and/or after the second reaction heating process in block 112 of FIG. 1, or at any other desired point of the method 100 of FIG. 1. Nitrogen may also be introduced from the bottom of the reactor 202 or in the combination of the headspace and the bottom of the mixing vessel 202.

The mixture of bitumen and tire rubber, i.e., the (modified or unmodified) first processed asphalt feedstock/tire rubber mixture, is heated to between 525° F. to 700° F. in the mixing vessel 202. In the illustrative embodiment, the agitator 210 internal to the mixing vessel 202 continues to uniformly mix the bitumen and tire rubber during this second heating process. The uniform mixing process avoids hot spots within the reaction vessel 202, i.e. mixing chamber.

The (modified, unmodified, enhanced, or unenhanced) dissolved tire rubber bitumen mixture may be quenched with the addition of bitumen or oil 226 through an external pump 220, which cools the dissolved tire rubber bitumen mixture from between 525° F. to 700° F. down to 500° F. or less. The pump 220 may transfer cool or unheated asphalt feedstock 206 directly into the reactor mixing vessel 202, as well as transfer the RDP product out of the reactor mixing vessel 202 for post-production use and/or modification. In another illustrative embodiment, water may be used to cool down the illustrative dissolved tire rubber bitumen mixture to 500° F. or less.

The resulting dissolved tire rubber bitumen mixture may then be referred to as the "RDP product" 222. The resultant RDP compound experiences a significant increase of penetration at 77° F. over the original bitumen while minimizing the oxidation and aging reactions associated with exposure of bitumen to high temperatures.

Fumes produced in the process may be disposed of with a scrubber/condenser 224 that neutralizes and/or collects VOCs and other hazardous gases in the fumes. Additionally, the interior reactor space may also be configured to receive a sulfur compound that cross-links the dissolved rubber, asphalt compound, the VOCs, or any combination thereof.

RDP Exemplary Embodiments

In the illustrative RDP embodiments presented herein, an asphalt feedstock is mixed with natural or synthetic rubber items, and the mixture is heated to 600° F. with stirring for at least 10 minutes. The illustrative embodiments show a substantial increase in the penetration of the resulting dissolved tire rubber and bitumen mixture or RDP compound, which is homogeneous and can be poured through a 100 mesh sieve. The RDP compound may be solubilized in D-Limonene with better than 99.0% passing through No. 54 Whatman filter paper.

RDP Example 1

In this illustrative RDP embodiment, an asphalt feedstock having a penetration of 135 dmm @ 77° F. is subjected to a first heating process where it is heated to between 320° F. to 420° F. An addition of GTR equal to 10% by weight of the resulting mixture was added to the heated bitumen and stirred at 4200 rpm. After 15 minutes of mixing, the mixing speed is reduced to 4000 rpm and stirring continues for an additional 15 minutes. During the stirring process, the mixture of bitumen and GTR is subjected to a second heating process where it is heated to between 600° F. and 605° F. The first processed bitumen/tire rubber mixture is then held at 600° F. to 605° F. for 15 minutes. After the bitumen/tire rubber mixture is heated to between 600° F. and 605° F. for 15 minutes, the stirrer is turned off and the mixture cools to between 350° F. to 360° F., and samples prepared for physical property testing.

The solubility of the RDP compound was tested by dissolving 3 grams of the compound in a 125 ml of a solution composed of at least 90% D-Limonene CAS 5989-27-5. The solution was warmed gently on a hot plate with stirring for between 5 to 7 minutes—at which point the solid or semi-solid RDP compound sample is visibly dissolved in the D-Limonene. The solution was allowed to return to ambient temperature (about 15 minutes without heating) and vacuum filtered using a No. 54 Whatman filter paper and Buchner funnel. It was found that 99.4% of the solution passed the filter leaving a gray-tan coloration on the filter paper.

TABLE I

| Property | Before Heating | After Heating | % Change |
| --- | --- | --- | --- |
| V275F D4402 (cP) | 250 | 352 | 71 |
| V350F D4402 (cP) | 48 | 83 | 173 |
| Soft. Point D38, (° F.) | 112 | 111 | 0 |
| Pen 77° F. D5 (dmm) | 135 | 200 | 148 |
| G*/sin δ @ 58 C., (Pa S) | 0.958 | 0.960 | 0 |
| G*/sin δ @ 52 C., (Pa S) | 2.21 | 1.30 | −41 |
| *D-Limonene Solubility using D2042 (%) | NA | 99.4 | NA |

(*D-Limonene substituted for trichloroethylene for safety)

Table I presents the physical properties "before heating" the feedstock, which does not include the 10% GTR and "before heating" to between 600° F. and 605° F., i.e., the second heating process. The addition of GTR and the second heating to between 600° F. and 605° F. results in a significant increase in viscosity as reflected by rows V275F and V350F. The increase in viscosity indicates that the GTR has been fully incorporated into the second processed asphalt feedstock/tire rubber mixture. Thus, the GTR is substantially more than a particle dispersion in the dissolved tire rubber bitumen mixture (RDP compound).

Table I also reflects that there is no significant change in softening point (Soft. Point) of the bitumen after the GTR is added and treated with the second heating process to between 600° F. and 605° F. However, a substantial increase in penetration (Pen) is observed after the GTR is digested at between 600° F. and 605° F. This increase in penetration is likely due to the release of compounding oils from the tire rubber into the bitumen, with little or no significant oxidation of the bitumen because of a Nitrogen purge on the reactor.

The G*/sin δ @ 58° C. (Pa S) is a rheological measure of road binder stiffness before any type of age conditioning. In this illustrative example, the oil released from the GTR has minimal impact on the road binder stiffness.

The G*/sin δ @ 52° C., (Pa S) is a rheological measure representing the measure of road binder stiffness by aging in a Rolling Thin Film Oven (RTFO) for 86 minutes at 140° C., which simulates aging in a paving hot mix plant. Typically, an unaged binder has a value of "1" before RTFO aging, and this value increases to approximately "2.2" following RTFO aging.

Interestingly, after heating produces the RDP tire rubber/bitumen mixture with Nitrogen purging, the RTFO aging value is "1.3." The inventors' postulate that the oils from the GTR that are extracted during the heating of the tire rubber/bitumen mixture reduce the effects of aging. This unexpected result substantially improves the aging of the resulting RDP compound.

To validate that the GTR has been solubilized into the asphalt the D-Limonene Solubility test as described in ASTM D2042 is utilized. The solubility test indicates that after a cold solvent wash, less than 0.6% residue remains, thus showing that the GTR has been substantially solubilized.

RDP Example 2

In this illustrative RDP embodiment, an 80 mesh GTR comprising 20% by weight of the mixture is mixed with an asphaltene having a penetration of less than 23 dmm. More specifically, the asphaltene having a penetration of less than 23 dmm @77° F. is first heated to between 320° F. and 420° F. An addition of GTR equal to 20% by weight of the resulting mixture was added to the heated bitumen and stirred at 4200 rpm. After between 10 and 20 minutes of mixing, the mixing speed is reduced to 4000 rpm and stirring continues for an additional 10 to 20 minutes. During the stirring process, the first processed asphalt and tire rubber mixture is subjected to a second heating process where it is heated to between 600° F. and 605° F. The first processed bitumen/tire rubber mixture is then subjected to a second heating process where it is held at 600° F. to 605° F. for 10 to 20 minutes. After the bitumen/tire rubber mixture is heated to between 600° F. and 605° F. for 10 to 20 minutes, the stirrer is turned off and the mixture cools to between 350° F.-360° F. and samples prepared for physical property testing. A significant increase in penetration at 77° F. is observed in Table II results.

TABLE II

| Property | Before Heating | After Heating | % Change |
|---|---|---|---|
| V275F D4402 (cP) | 1174 | 1160 | 1 |
| V350F D4402 (cP) | NA | NA | NA |
| Soft. Point D38, (° F.) | 144 | 127 | -12 |
| Pen 77° F. D5 (dmm) | 22 | 77 | 250 |
| G*/sin δ @ 58 C., (Pa S) | NA | NA | NA |
| G*/sin δ @ 52 C., (Pa S) | NA | NA | NA |
| *D-Limonene Solubility using D2042 (%) | NA | 99.2 | NA |

RDP Example 3

In a third illustrative RDP embodiment, an asphaltene feedstock having a penetration of less than 23 dmm was mixed with an addition of GTR equal to 20% by weight of the resulting mixture, the GTR having a 30 mesh size. The same method as described in RDP Examples 1 and 2 was applied in RDP Example 3. The results show a significant increase in penetration at 77° F. as observed in the initial experiment confirming the validity of the result with a larger GTR particle size.

TABLE III

| Property | Before Heating | After Heating | % Change |
|---|---|---|---|
| V275F D4402 (cP) | 1174 | 1347 | 15 |
| V350F D4402 (cP) | NA | NA | NA |
| Soft. Point D38, (° F.) | 144 | 139 | -3 |
| Pen 77° F. D5 (dmm) | 22 | 65 | 195 |
| G*/sin δ @ 58 C., (Pa S) | NA | NA | NA |
| G*/sin δ @ 52 C., (Pa S) | NA | NA | NA |
| *D-Limonene Solubility using D2042 (%) | NA | 99 | NA |

Modified and Enhanced RDP Embodiments

In the illustrative embodiments presented herein, an RDP compound is mixed under low shear with an asphalt feedstock and/or a process oil, and a sulfur cross-linking agent for 3-5 hours at 320° F. to 420° F. To this mixture of RDP compound, bitumen, and sulfur is then added an SBC under high shear mixing at 320° F. to 420° F. for 15 minutes to 2 hours. The resulting modified and enhanced RDP compound is then allowed to cure for 12 hours to 2 days. The illustrative embodiments show that paving binders comprising the modified and enhanced RDP compounds experience exceptional resistance to fatigue cracking, up to 60% reduced viscosity, require ~50% less SBC to obtain elastic recovery above 90%, and have a calculated non-recoverable creep compliance (Jnr) below 0.1 KPa-1 at a SBC wt. % content that is ~½ that required for linear high vinyl polymers.

Example 4

In this illustrative embodiment, the RDP compound includes between 40% and 50% tire rubber by weight and a bitumen having a penetration between 17 dmm and 80 dmm @ 77° F. The RDP compound has a penetration between 40 dmm and 60 dmm, and a viscosity between 1000 cP and 4000 cP at 275° F. The process oil is a high aromatic, high flash point oil that is mixed with the RDP compound in a ratio of 1 part oil to 3 parts RDP compound. An exemplary process oil is Holly Frontier, designated "LPH". The sulfur added comprises 0.5% to 0.05% by weight. The SBC is a high molecular weight radial SBS having a high vinyl content, such as LCY's GP-3741 SBS. The SBS added comprises 2.5% to 3.5% by weight.

The RDP product, asphalt feedstock and/or a process oil, and a sulfur cross-linking agent were mixed with low shear for 4 hours at 380° F. To this mixture was added the SBS under high shear mixing for 60 minutes at 380° F. The resulting modified and enhanced RDP compound was allowed to cure under low shear mixing for 20 hours.

Example 5

In this illustrative embodiment, the RDP compound includes between 40% and 50% tire rubber by weight and an asphalt having a penetration between 17 dmm and 80 dmm @ 77° F. The RDP compound has a penetration between 40 dmm and 60 dmm, and a viscosity between 1000 cP and 4000 cP at 275° F. The process oil is a high aromatic, high flash oil that is mixed with the RDP compound in a ratio of 1 part oil to 3 parts RDP compound. An exemplary process oil is Holly Frontier, designated "LPH". In one embodiment, the RDP compound comprises an addition of sulfur equal to between 0.5% to 0.05% by weight. The SBC is a high molecular weight radial SBS having a high vinyl content, such as LCY's GP-3741 SBS. The SBS added comprises 2.5% to 3.5% by weight.

The RDP compound, asphalt feedstock and/or a process oil, and a sulfur cross-linking agent were mixed with low shear for 4 hours at 380° F. To this mixture was added the SBS under high shear mixing for 30 minutes at 380° F. The resulting modified and enhanced RDP compound was allowed to cure under low shear mixing for 20 hours.

Method for Controlling Localized Polymer Concentrations

Figure 3:
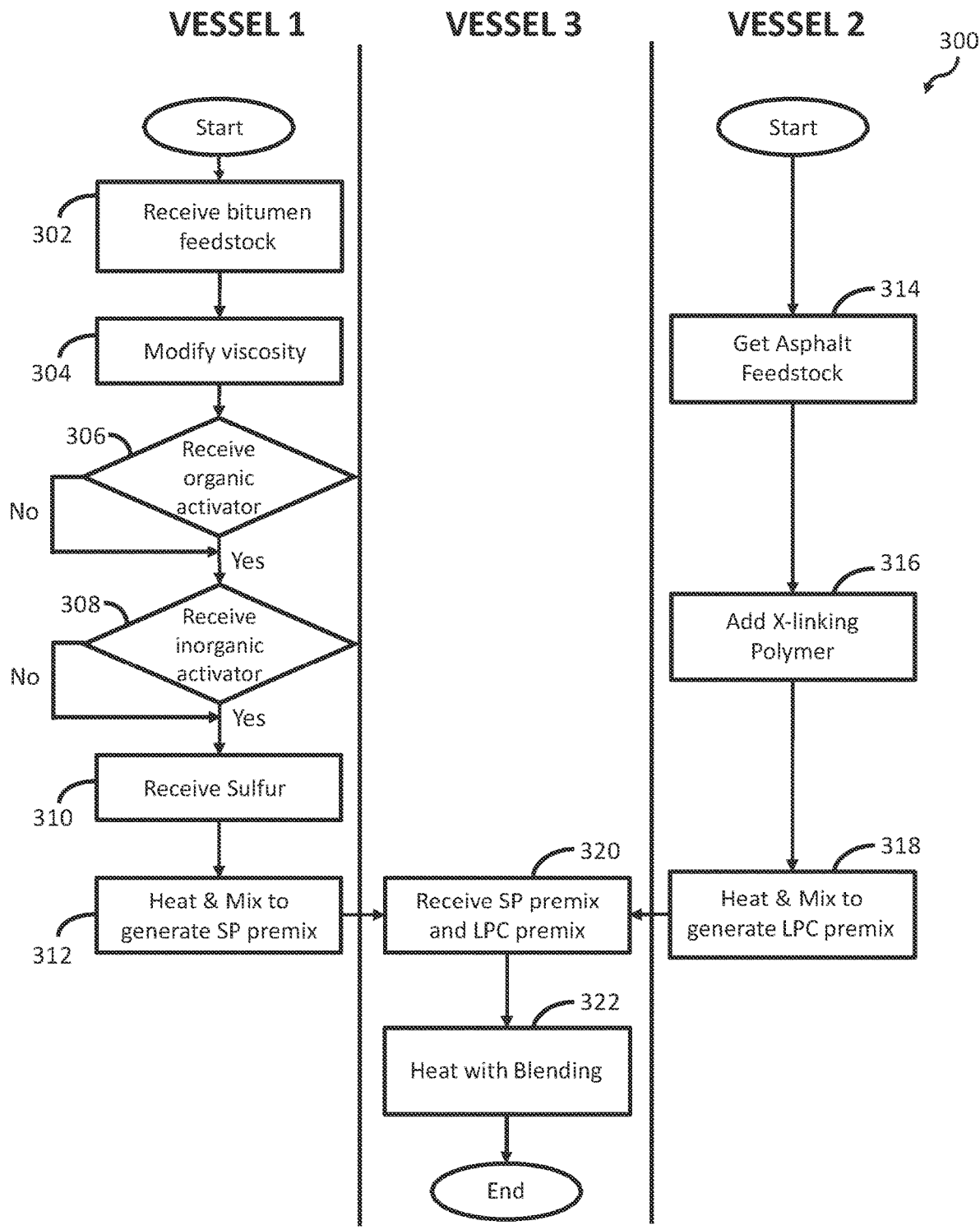
FIG. 3 shows a flow chart of a method for generating a roofing coating having localized polymer concentrations.

With reference now to FIG. 3, there is shown an illustrative method 300 for generating a modified bitumen material having localized polymer concentrations ("LPCs") formed from cross-linked cross-linking polymer cores, termed the "LPC product." Such LPC products are suitable for use as roofing coatings. Generally, the LPC product is prepared in a LPC process 300 by first generating a saturated polymer ("SP") premix, which is also termed a rapid digestion process ("RDP") premix in some embodiments, and separately generating a LPC premix. Upon generation, the SP premix and LPC premix are combined, heated, and blended to form the LPC product.

The method 300 is initiated in the vessel 1 column where a SP premix is generated at blocks 302 through 312. At block 302 a bitumen feedstock compound is received in a first vessel. The bitumen feedstock compound may be any one of: a bituminous tar or pitch (i.e., non-oxidized bitumen, oxidized bitumen, partially oxidized bitumen), a dissolved tire rubber bitumen mixture (or other rubber bitumen mixtures), a modified RDP compound, an enhanced RDP compound, a modified enhanced RDP compound, or any combination thereof. Any of the RDP compounds employed as the bitumen feedstock may comprise up to 70% tire rubber by weight. The tire rubber may be highly processed GTR of 80 mesh or larger, up to and including large scrap tire chunks ranging up to whole unprocessed tires that may or may not: (1) be vulcanized, (2) have fabric ply woven in the tire rubber, or (3) include steel or metal belting. In an illustrative embodiment, the bitumen feedstock is an RDP compound that comprises 5% to 50% tire rubber scrap by weight.

At block 304 a polymer with a saturated carbon backbone is added to the bitumen feedstock in the vessel 1 column to modify the viscosity of the bitumen feedstock and thereby the resulting SP premix. This viscosity modifying polymer reduces the viscosity of the bitumen feedstock (e.g., RDP compound) in the first vessel and allows the resulting SP premix (termed "saturated polymer" or "SP" generally, and "RDP" premix when RDP is used as the bitumen feedstock compound) to more easily flow and mix with the LPC premix. In some embodiments, the viscosity modifying polymer can be an olefinic elastomer, such as ethylene-propylene-diene-monomer (EPDM) rubber; an olefinic vinyl acetate; block copolymers, such as HSBC, SEC, or SEBS; a thermoplastic vulcanizate; polyurethane; a copolyester; polyester; polyamide; natural rubber; or any combination thereof.

In the embodiments where the viscosity modifying polymer is a block copolymer, the block copolymer can be branched, linear (i.e., SEBS), diblock, triblock, tetrablock, or multiblock. In other embodiments, the block copolymer has the general formulae S—B—S(I), or (S—B)$_n$—X (II), and may contain varying amounts of diblock S—B (III) up to 100%. In these formulae, each "S" independently is a poly(vinyl aromatic), and each "B" independently is a saturated alkyl chain or cycloalkyl block, "n" is an integer equal to or greater than 2, and "X" is the residue of a coupling agent, where the coupling agent can be any di- or polyfunctional coupling agent known in the art.

An illustrative vinyl aromatic monomer for the poly(vinyl aromatic) block, "S," is styrene. In some embodiments, the styrene moiety forming the viscosity modifying polymer are substantially pure monomers or a major component in mixtures with minor proportions of other structurally related vinyl aromatic monomer(s), such as o-methylstyrene, p-methylstyrene, p-tert-butylstyrene, 2,4-dimethylstyrene, α-methylstyrene, vinylnaphtalene, vinyltoluene and vinylxylene. Similarly, in some embodiments, the alkyl or cycloalkyl moiety forming the viscosity modifying polymer are substantially pure monomers or can contain minor proportions of structurally related alkyls and cycloalkyls.

In the illustrative embodiment, the viscosity modifying polymer added to this first vessel is SEBS, which comprises 4%-8% by weight of the resulting saturated polymer premix. In a narrower embodiment, the viscosity modifying polymer is SEBS and comprises 6% by weight of the resulting SP premix.

At decision diamond 306, a determination is made whether to further add an organic activator to this first vessel. The organic activator can be a fatty acid salt, such as calcium, magnesium, or aluminum salts of stearic, lauric, palmitic, oleic, and naphthenic acid. In the illustrative embodiment, the organic activator is calcium stearate. In some embodiments, the organic activator increases the cure rate of the polymer cross-links by accelerating the sulfur substitution cross-linking reactions. In other embodiments, the organic activator reacts with another activator (such as the inorganic activator discussed below) to form an activator complex in situ. Calcium stearate can act as an activator for both sulfur-based polymer cross-linking and C—C cross-linking achieved with peroxide. Generally, calcium stearate increases the cure rate due to the catalysis and acceleration of sulfur cross-linking, this also promotes shorter sulfide cross-links (i.e., fewer sulfur atoms forming cross-link bridges between polymers, and driving the system towards monosulfide cross-links) and the achievement of higher cross-linking densities. The length of the sulfide cross-links between polymers is known generally to directly affect the cross-linking density of the final LPC product, with the average number of sulfur atoms in the cross-link chains being inversely proportional to the cross-linking efficiency. Upon addition of an organic activator or where the determination is made not to add an organic activator, the method proceeds to decision diamond 308.

At decision diamond 308, a determination is made whether to add an inorganic activator to this first vessel. The inorganic activator component can be a metal oxide or metal hydroxide. In some embodiments, the metal oxide is zinc oxide, cadmium oxide, mercury oxide, beryllium oxide, magnesium oxide, calcium oxide, nickel oxide, copper oxide, indium oxide, lead oxide, or any combination thereof. In other embodiments, the inorganic activator is an alternative form of zinc, such as nanosized ZnO particles, zinc complexes, zinc-based activators inserted in porous materials or supported on a substrate (i.e., zinc loaded clays), ZnO nanoparticles dispersed onto a support, or any combination thereof. In the illustrative embodiment, the inorganic activator is zinc oxide. In some embodiments, the inorganic activator increases the cure rate of polymer cross-links by accelerating the sulfur substitution cross-linking reactions. In other embodiments, the inorganic activator reacts with another activator (such as the organic activator discussed above) to form an activator complex in situ. Zinc oxide can act as an activator for both sulfur-based polymer cross-linking and C—C cross-linking achieved with peroxide. Generally, zinc oxide increases the cure rate due to the catalysis and acceleration of sulfur cross-linking, this also promotes shorter sulfide cross-links (i.e., fewer sulfur atoms forming cross-link bridges between polymers, and driving the system towards monosulfide cross-links) and as a result the achievement of higher cross-linking densities. The length of the sulfide cross-links between polymers is known generally to directly affect the cross-linking density of the final product, with the average number sulfur atoms in the cross-link chains being inversely proportional to the cross-linking efficiency. Upon addition of an inorganic activator or where the determination is made not to add an inorganic activator, the method proceeds to block 310.

Where both the organic activator and the inorganic activator are added to the first vessel, an activator complex formed from the combination of the organic and inorganic activators increases the cure rate of polymer cross-linking by catalyzing and accelerating sulfur cross-linking reactions, promoting shorter sulfide cross-links by driving the reaction system towards monosulfide cross-links, and achieving higher cross-link densities. Each of the organic activator, the inorganic activator, an activator complex formed from the organic and inorganic activators, and any combination thereof can react with sulfur to form a sulfurating agent that facilitates sulfur substitution into C═C double bonds of a polymer backbone (i.e., vinyl groups) or side chain (i.e., aromatic groups), which leads to sulfur cross-links between polymers. The physical, chemical, and mechanical properties of any vulcanized material correlate with the relative amount of mono-, di-, or poly-sulfide cross-links, which relative amounts strongly depend on the organic activators, inorganic activators, and the composition of rubbers and polymers on which the activators operate. In some embodiments, after forming poly-sulfide cross-links, the cross-links between rubber chains undergo a progressive degradation process toward shorter sulfur cross-links.

In the illustrative embodiment, Inventors hypothesize that zinc oxide and calcium stearate form an activator complex that reacts with available sulfur to form a sulfurating agent. In some embodiments, stearic acid solubilizes the zinc in zinc oxide by complexing with the zinc. However, in the presence of sulfur, neither the organic activator, the inorganic activator, nor an activator complex formed from the organic and inorganic activators effect cross-linking of the viscosity modifying polymer, because such polymers have saturated back-bones lacking any C═C double bonds into which sulfur may substitute.

At block 310 sulfur is added to the first vessel as a cross-linking agent. In some embodiments, the sulfur cross-linking agent is sulfur or a sulfur donor. Suitable types of sulfur include, but are not limited to, elemental sulfur, such as cyclic $S_6$, $S_7$, $S_8$, $S_{12}$, $S_{18}$, rhombic sulfur (Sa), monoclinic sulfur (SR); amorphous ("plastic") sulfur; polycationic sulfur, such as $S_8^{2+}$, $S_4^{2+}$, $S_{16}^{2+}$; anionic sulfur salts, such as $Na_2S_8$; and any other commercially available sulfur source. Any of these added sulfurs may be in the form of a powder, a slurry, or molten. Illustrative sulfur donors include sulfur containing compounds, such as tetraalkylthiuram sulfides, sulfonamides, and morpholine. Sulfur donors generate active sulfur fragments in solution that induce cross-linking when in the presence of (C═C) bonds. In the illustrative embodiment, the sulfur cross-linking agent added is elemental sulfur.

At block 312 the mixture of the bitumen feedstock, viscosity modifying polymer, and one, both, or neither of the organic activator and inorganic activator are heated to between 320° F. and 500° F. with high shear mixing for between 15 minutes and 60 minutes to generate the saturated polymer premix. In the illustrative embodiment, the mixture of a RDP compound, 4-8% SEBS by weight, calcium stearate, zinc oxide, and elemental sulfur are heated to 400° F. with high shear mixing for 25 minutes to generate the RDP premix. The temperature at which the components comprising the RDP premix are heated results from the balance of competing limitations: the flashpoint of the components of the RDP premix and the time required to adequately dissolve the viscosity modifying polymer into the bitumen feedstock (e.g., RDP compound). The upper limit of 500° F. is the theorized highest flashpoint for any formulation of the SP premix, while certain formulations may have a lower flashpoint requiring heating at lower temperatures. The lower limit of 320° F. is the theorized lowest temperature at which the viscosity modifying polymer could be dissolved into a bitumen feedstock during a commercially feasible mixing time. Thus, as the heating temperature increases for any given SP premix formulation, the mixing time is reduced. Similarly, as the heating temperature decreases, the mixing time is enlarged.

For example, the inventors theorize that heating the illustrative mixture of the RDP compound, 4-8% SEBS, calcium stearate, zinc oxide, and elemental sulfur at 385° F. requires high shear mixing for up to 12 hours to sufficiently dissolve the SEBS into the RDP compound and form the RDP premix. Additionally, the required mixing time and heating temperature are dependent on the fineness of the powder or pellet in which the viscosity modifying polymer is supplied and introduced into the first vessel, i.e. the larger the pellet or coarser the powder, the longer the mixing time and/or the higher the heating temperature required to drive the viscosity modifying polymer into the liquid phase of the RDP compound in the first vessel to form the RDP premix.

Separate to the preparation of the SP premix, a LPC premix is generated from at least two components at blocks 314 through 318 in the vessel 2 column. At block 314 a bituminous asphalt feedstock is received in the second vessel. The asphalt feedstock may be bitumen-based (i.e., oxidized, partially oxidized, non-oxidized), a modified RDP compound, an enhanced RDP compound, a modified enhanced RDP compound, or any combination thereof.

At block 316 one or more cross-linking polymers are added to the bitumen feedstock in vessel 2. In some embodiments, cross-linking polymers include polymers with repeating C═C bonds along the carbon backbone or in side chain groups. Thus, the cross-linking polymer may comprise an olefinic elastomer; olefinic vinyl acetate; block copolymers, such as SBS, SB, SIS; thermoplastic vulcanizate; polyurethane; copolyester; polyester; polyamide; or any combination thereof. In a narrower embodiment, the cross-linking polymer may comprise a block copolymer, wherein the block copolymer can be branched, linear (i.e., SBS, SB, SIS), diblock (i.e., SB), triblock, tetrablock, or multiblock. In other embodiments, the block copolymer has the general formulae S—B—S(I), or (S—B)$_n$—X (II), and may contain varying amounts of diblock S—B (III) up to 100%. In these formulae, each "S" independently is a poly(vinyl aromatic), and each "B" independently is an unsaturated alkene chain or cycloalkene block, "n" is an integer equal to or greater than 2, and "X" is the residue of a coupling agent, where the coupling agent can be any di- or polyfunctional coupling agent known in the art.

In narrower embodiments, cross-linking polymers include SBCs comprising at least two polymer blocks, wherein at least one polymer block is substantially made of an aromatic vinyl compound and at least one polymer block is substantially made of a conjugated diene compound. In the illustrative embodiment, SB copolymer and SBS copolymer are added to the asphalt feedstock in vessel 2.

An illustrative vinyl aromatic monomer for the poly(vinyl aromatic) block, "S," is styrene. In some embodiments, the styrene moieties forming the viscosity modifying polymer are substantially pure monomers or a major component in mixtures with minor proportions of other structurally related vinyl aromatic monomer(s), such as o-methylstyrene, p-methylstyrene, p-tert-butylstyrene, 2,4-dimethylstyrene, α-methylstyrene, vinylnaphtalene, vinyltoluene and vinylxylene. Similarly, in some embodiments, the alkyl or cycloalkyl moieties forming the viscosity modifying polymer are substantially pure monomers or can contain minor proportions of structurally related alkyls and cycloalkyls.

At block 318 the LPC premix components received in the second vessel are heated to between 320° F. and 500° F. with medium or high shear mixing for between 1 minute to 1 hour to generate the LPC premix having partially- or semi-dispersed cross-linking polymer cores therein, which cross-linking polymer cores form the LPCs in the LPC product. This abbreviated heating and mixing time generates the cross-linking polymer cores from the cross-linking polymers added to the asphalt feedstock at block 316. The cross-linking polymer is received in the second vessel as pellets (i.e., granules or particles) ranging in size from approximately ½ inch mesh granules (or 12.7 mm) down to 200 mesh (or 0.074 mm) particles. As used herein, the terms "granules" and "particles" are general references to large polymer pellets (granules) versus small polymer pellets (particles), but do not otherwise connote a particular size or shape of polymer pellet. During this heating and mixing step, the cross-linking polymer pellets begin to unwind from their pellet configuration but retain a macroscopic (visible to the naked eye) or microscopic (not visible to the naked eye, i.e., requiring magnification to visualize) pellet core connected to at least one of the polymer chains that have unwound from the pellet. Thus, the heating and mixing of block 318 generates the partially-dispersed cross-linking polymer cores of the LPC premix by partially unwinding the cross-linking polymers from their pellet form.

The temperature at which the mixture is heated in block 318 results from a balance of competing limitations, the flashpoint of the mixture of LPC premix components and the time required to mix the cross-linking polymer into the LPC premix to the degree desired. The upper limit of 500° F. is the theorized highest flashpoint for any formulation of the LPC premix, while certain formulations may have a lower flashpoint requiring heating at lower temperatures. The lower limit of 320° F. is the theorized lowest temperature at which the cross-linking polymer could begin dispersion (i.e., unwinding) and dissolution into the bitumen of the LPC premix and proceed to a desired degree during a commercially feasible mixing time without proceeding beyond the desired degree of dispersion and dissolution, i.e., too completely dissolving into the LPC premix. Thus, as the heating temperature increases for any given LPC premix formulation, the mixing time is reduced. Similarly, as the heating temperature decreases, the mixing time is extended. In the illustrative embodiment, the LPC premix components received in the second vessel are heated to 400° F. with medium or high shear mixing for 1 to 5 minutes to generate the LPC premix.

The method 300 continues in the vessel 3 column at block 320 where the SP premix and the LPC premix are received in a third vessel. In some embodiments, the third vessel is the first vessel containing the SP premix, and the LPC premix is simply added to the SP premix in the first vessel. In other embodiments, the third vessel is the second vessel containing the LPC premix, and the SP premix is simply added to the LPC premix in the second vessel.

At block 322 the combination of the SP premix and LPC premix is heated to 320° F. and 500° F. with blending for 30 minutes to 240 minutes to generate a bitumen composition incorporating LPCs, this asphalt composition is termed the "LPC product." During this blending and heating step, the sulfur cross-linking agent, and any organic activator and/or inorganic activator in the SP premix react with the partially dispersed cross-linking polymer in the LPC premix. This reaction cross-links the cross-linking polymer to itself, to other cross-linking polymers, to natural rubber chains, and other compounds in the LPC premix containing C=C bonds susceptible to S—C substitution insertions. These cross-links have the effect of preventing further unwinding of the cross-linking polymer cores by locking the cross-linking polymers making up such cores in place with cross-links. These cross-links occur between different cross-linking polymer chains in a particular core, between a single cross-linking polymer chain in a particular core, between different cross-linking polymer chains in two different cores, between a partially unwound cross-linking polymer chain and a polymer chain fully incorporated into a core, between a partially unwound cross-linking polymer chain on one core and a partially unwound cross-linking polymer chain on the same core or a second core, or any combination thereof. Thus, when the cross-linking polymer and the sulfur cross-linking agent are present in sufficiently high concentrations, the cross-linking polymer cross-links to form localized polymer concentrations ("LPCs") that remain in place and do not dissolve into the SP premix, the LPC premix, or the combination of the two premixes (i.e., the LPC product), even after an extended period of heated mixing.

As with the heating steps of blocks 312 and 318 above, the upper limit of 500° F. is the theorized highest flashpoint for any formulation of the LPC product, while certain formulations may have a lower flashpoint requiring heating at lower temperatures. The lower limit of 320° F. is the theorized lowest temperature at which the SP premix and the LPC premix thoroughly mix and cross-link in a commercially viable amount of time. Thus, as the heating temperature increases for any given LPC product formulation, the mixing time may be reduced. Similarly, as the heating temperature decreases, the mixing time may be extended.

In the illustrative embodiment, the RDP premix and the LPC premix are heated to between 390° F. and 410° F. and blended for 30 minutes to 240 minutes. During this heating and blending the elemental sulfur, stearic acid, and zinc oxide of the RDP premix react with the SB and SBS of the LPC premix to form sulfur cross-links between SB and SB, SB and SBS, SBS and SBS, SB and natural rubber components, SBS and natural rubber components, and any combination thereof. These sulfur cross-links prevent complete dissolution of the SB cores or the SBS cores, creating LPCs of the SB, SBS, natural rubber, and any combination thereof.

In the illustrative embodiment, SEBS copolymer forms an extended polymer network that is plasticized by the digested tire rubber of the RDP premix. Additionally, the SBS and SB from the LPC premix that have cross-linked and gelled into LPCs at block 322 are encapsulated by the fully extended network of SEBS copolymers in the RDP premix. The SEBS polymers associate with one another as well as the cross-linked and gelled SBS and SB polymers through aromatic face-to-edge attractive electrostatic interactions between styrene groups of the SEBS, SB, and SBS polymers. The SEBS network fully adsorbs the maltene fraction of the bitumen feedstock becoming the dominant polymer phase and contributing beneficial resistance flow properties to the resulting LPC product.

Inventors hypothesize that desirable mechanical properties flow from preventing complete dissolution of the cross-linking polymers into the LPC premix. The LPCs of cross-linked cross-linking polymers are gelatinous bodies of undissolved polymer suspended in the mixture of asphalt feedstock of the LPC premix and the bitumen feedstock of the SP premix, that the prior art found disastrous. Contrary to the prior art, the inventors find that the impact resistance of asphalt compositions strategically incorporating stable LPC gel bodies improve due to incorporation of the gelled LPCs. Inventors hypothesize that impact resistance improves because the gelled LPCs are essentially tiny rubber balls inside the LPC product that operate similar to high impact polystyrene, by absorbing energy from objects striking applications of the LPC product (i.e., hail impacting roofing coatings formed from the LPC product). By absorbing these impact energies, LPC incorporation prevents propagation of microcracks generated from impact events, thereby increasing the service life of any products utilizing the LPC product.

Therefore, a desired degree of dissolution of the cross-linking polymers into the LPC premix is one where a measurable fraction of the added cross-linking polymer pellets retain core portions that are undissolved. This desired degree of dissolution and the ultimate creation of LPCs from the polymer pellet cores is controlled through the rate of mixing, heating temperature, and time of mixing. As the size of polymer pellet or granule employed increases, some combination of increased mixing rate, higher heating temperature, and increased mixing time is required to achieve a desired dissolution and cross-linking polymer core size remaining in the LPC premix. Conversely, as the size of polymer pellet or granule employed decreases, some combination of decreased mixing rate, lower heating temperature, and shortened mixing time is required to achieve a desired dissolution and cross-linking polymer core size remaining in the LPC premix.

In a broadest embodiment, the SP premix and LPC premix are heated to 320° F. and 500° F. with blending for 30 minutes to 240 minutes to form the LPC product. In a narrower embodiment, the SP premix and LPC premix are heated to 390° F. and 410° F. with blending for 30 minutes to 240 minutes to form the LPC product.

In an alternative embodiment, the sulfur cross-linking agent is added to the mixture of the SP premix and the LPC premix in the vessel 3 column. In some embodiments, this addition is the first and only addition of the sulfur cross-linking agent. In other embodiments, this addition is subsequent to the prior addition of a sulfur cross-linking agent in the vessel 1 column at block 310.

Modified Method for Controlling Localized Polymer Concentrations

Figure 4:
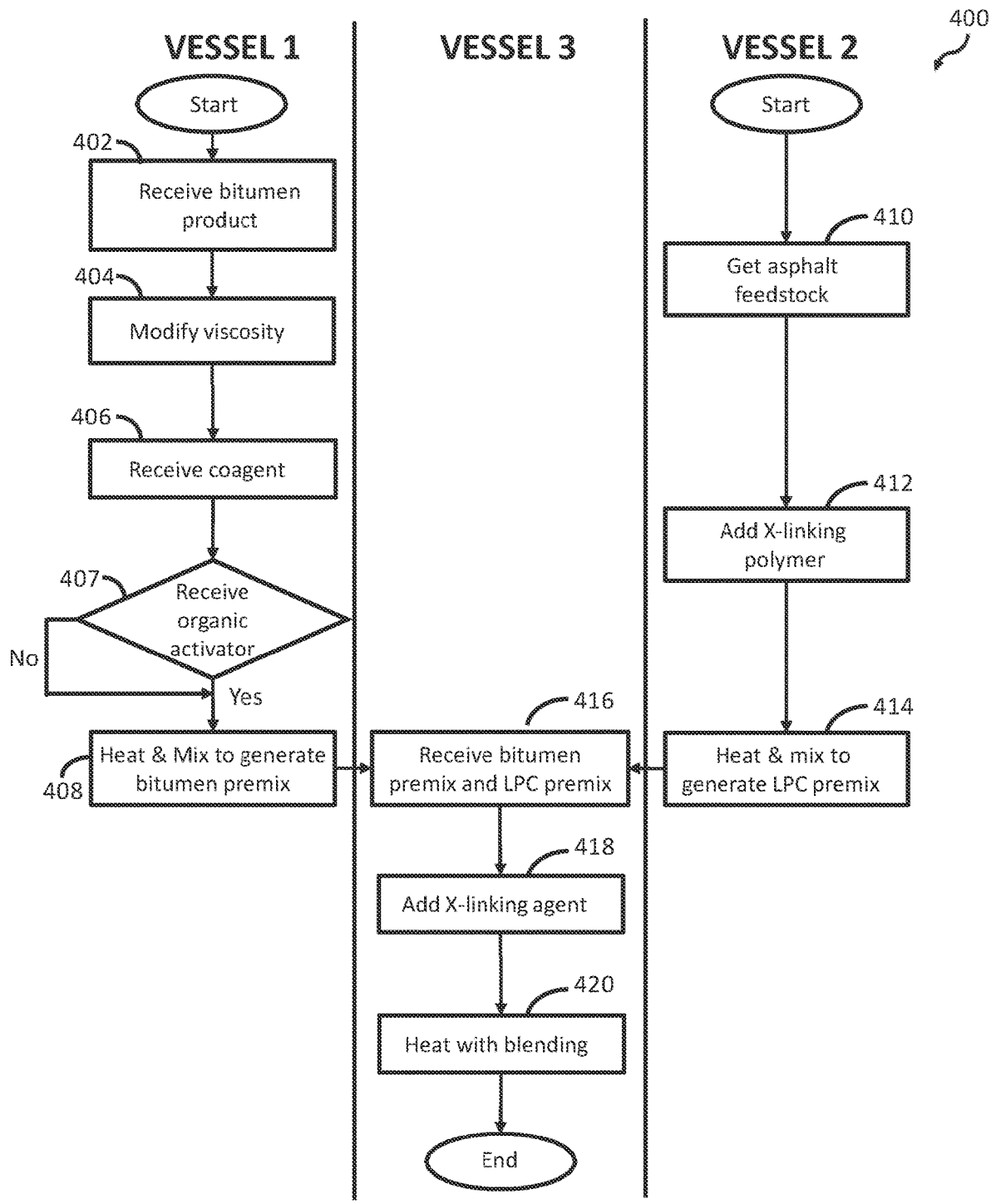
FIG. 4 shows a flow chart of a modified method for generating a roofing coating having localized polymer concentrations.

Referring now to FIG. 4, there is shown an illustrative modified method for generating a roofing coating having localized polymer concentrations ("modified LPC product") 400. Generally, the modified LPC product is prepared in a modified LPC process 400 by first generating a modified bitumen premix (in some embodiments termed the modified rapid digestion process ("RDP") premix where the bitumen feedstock is an RDP compound), and separately generating the LPC premix. Upon generation of the modified bitumen premix, the modified bitumen premix and LPC premix are combined, a peroxide is added to this combination, and the combination is then heated and blended to form the modified LPC product.

The modified method 400 is initiated in the vessel 1 column where a modified bitumen premix is generated at blocks 402 through 408. At block 402 a bitumen feedstock is received in a first vessel. The bitumen feedstock may comprise any bituminous tar or pitch (i.e., non-oxidized, partially oxidized, oxidized), a dissolved tire rubber bitumen compound, an RDP compound, a modified RDP compound, an enhanced RDP compound, a modified enhanced RDP compound, and any combination thereof. Any of the RDP compounds may comprise up to 70% tire rubber by weight. The tire rubber may be highly processed GTR of 80 mesh or larger, up to and including large scrap tire chunks ranging up to whole unprocessed tires that may or may not: (1) be vulcanized, (2) have fabric ply woven in the tire rubber, or (3) include steel or metal belting.

At block 404, 4%-8% by weight of a polymer with a saturated carbon backbone is added to the bitumen feedstock compound in the vessel 1 column to modify the viscosity of the bitumen feedstock compound and thereby the resulting modified bitumen premix. This viscosity modifying polymer reduces the viscosity of the bitumen feedstock in the first vessel and allows the resulting modified bitumen premix to more easily flow and mix with the LPC premix. In some embodiments, the viscosity modifying polymer can be an olefinic elastomer, such as ethylene-propylene-diene-monomer (EPDM) rubber; olefinic vinyl acetate; block copolymers, such as HSBC, SEC, or SEBS; thermoplastic vulcanizate; polyurethane; copolyester; polyester; polyamide; natural rubber; or any combination thereof.

In the embodiments where the viscosity modifying polymer is a block copolymer, the block copolymer can be branched, linear (i.e., SEBS), diblock, triblock, tetrablock, or multiblock. In other embodiments, the block copolymer has the general formulae S—B—S(I), or $(S-B)_n-X$ (II), and may contain varying amounts of diblock S—B (III) up to 100%. In these formulae, each "S" independently is a poly(vinyl aromatic), and each "B" independently is a saturated alkyl chain or cycloalkyl block, "n" is an integer equal to or greater than 2, and "X" is the residue of a coupling agent that can be any di- or polyfunctional coupling agent known in the art.

An illustrative vinyl aromatic monomer for the poly(vinyl aromatic) block, "S," is styrene. In some embodiments, the styrene moieties forming the viscosity modifying polymer are substantially pure monomers or a major component in mixtures with minor proportions of other structurally related vinyl aromatic monomer(s), such as o-methylstyrene, p-methylstyrene, p-tert-butylstyrene, 2,4-dimethylstyrene, α-methylstyrene, vinylnaphtalene, vinyltoluene and vinylxylene. Similarly, in some embodiments, the alkyl or cycloalkyl moieties forming the viscosity modifying polymer are substantially pure monomers or can contain minor proportions of structurally related alkyls and cycloalkyls.

Further added to this first vessel at block 406 is a peroxide coagent, generally referred to as a cross-linking agent. Peroxide coagents promote more efficient formation of cross-links by establishing higher concentrations of reactive sites and by reducing the chance of deleterious radical side reactions. Although in no way limiting, the peroxide coagent can be a difunctional compound that favors network formation through increased local concentrations of easily-abstractable allylic hydrogens or other very reactive sites of unsaturation. In some embodiments, the peroxide coagent is a polar multifunctional low molecular weight compound that can be homopolymerized or grafted to the polymer chains, such as multifunctional acrylate and methacrylate esters and dimaleimides (including zinc salts of these compounds). In narrow embodiments, the peroxide coagent is any one of Trifunctional (meth)acrylate ester, N,N'-m-phenylene dimaleimide, zinc diacrylate, scorch retarded zinc dimethacrylate, scorch retarded poly(butadiene) diacrylate. In other embodiments, the peroxide coagent forms radicals primarily through hydrogen abstraction, such as allyl-containing cyanurates, allyl-containing isocyanurates, allyl-containing phthalates, homopolymers of dienes, and copolymers of dienes and vinyl aromatics. In a narrower embodiment, the peroxide coagent is any one of triallyl cyanurate, triallyl isocyanurate, and high vinyl poly(butadiene).

At decision diamond 407, a determination is made whether to further add an organic activator, such as calcium stearate, to this first vessel. The organic activator increases the cure rate by accelerating the cross-linking reactions. Calcium stearate can act as an activator for both sulfur-based polymer cross-linking and C—C cross-linking achieved with peroxide. Generally, calcium stearate increases the cure rate of the polymer cross-links by accelerating radical recombination reactions. Where the determination is made not to add an organic activator, the method proceeds to decision block 408.

At block 408 the mixture of the bitumen feedstock, viscosity modifying polymer, and peroxide coagent are heated to between 320° F. and 500° F. with medium or high shear mixing for between 15 minutes and 60 minutes to generate the modified bitumen premix. The temperature at which the mixture is heated results from the balance of competing limitations, the flashpoint of the mixture and the time required to dissolve the viscosity modifying polymer into the bitumen feedstock. The upper limit of 500° F. is the theorized highest flashpoint for any formulation of the modified bitumen premix, while certain formulations may have a lower flashpoint requiring heating at lower temperatures. The lower limit of 320° F. is the theorized lowest temperature at which the viscosity modifying polymer could be dissolved into the bitumen feedstock during a commercially feasible mixing time. Thus, as the heating temperature increases for any given modified bitumen premix formulation, the mixing time is reduced. Similarly, as the heating temperature decreases, the mixing time is extended.

Separate to the preparation of the modified bitumen premix, a LPC premix is generated from at least two components at blocks 410 through 414 in the vessel 2 column. At block 410 an asphalt feedstock is received in the second vessel. The asphalt feedstock may be bituminous (i.e., oxidized, partially oxidized, non-oxidized), a dissolved tire rubber bitumen mixture (or other rubber bitumen mixtures), a modified RDP compound, an enhanced RDP compound, a modified enhanced RDP compound, or any combination thereof.

At block 412 one or more cross-linking polymers are added to the asphalt feedstock in vessel 2. In some embodiments, the cross-linking polymer may comprise an olefinic elastomer; olefinic vinyl acetate; block copolymers, such as SEBS, SEC, SBS, SB, SIS; thermoplastic vulcanizate; polyurethane; copolyester; polyester; polyamide; or any combination thereof. In a narrower embodiment, the cross-linking polymer may comprise a block copolymer, wherein the block copolymer can be branched, linear (i.e., SEBS, SEC, SBS, SB, SIS), diblock (i.e., SB), triblock, tetrablock, or multiblock. In other embodiments, the block copolymer has the general formulae S—B—S(I), or $(S-B)_n-X$ (II), and may contain varying amounts of diblock S—B (III) up to 100%. In these formulae, each "S" independently is a poly(vinyl aromatic), and each "B" independently is a saturated alkyl chain, a saturated cycloalkyl block, an unsaturated alkene chain, or an unsaturated cycloalkene, "n" is an integer equal to or greater than 2, and "X" is the residue of a coupling agent, where the coupling agent can be any di- or polyfunctional coupling agent known in the art. In narrower embodiments, cross-linking polymers include SBCs comprising at least two polymer blocks, wherein at least one polymer block is substantially made of an aromatic vinyl compound and at least one polymer block is substantially made of a conjugated diene compound.

An illustrative vinyl aromatic monomer for the poly(vinyl aromatic) block, "S," is styrene. In some embodiments, the styrene moieties forming the viscosity modifying polymer are substantially pure monomers or a major component in mixtures with minor proportions of other structurally related vinyl aromatic monomer(s), such as o-methylstyrene, p-methylstyrene, p-tert-butylstyrene, 2,4-dimethylstyrene, α-methylstyrene, vinylnaphtalene, vinyltoluene and vinylxylene. Similarly, in some embodiments, the alkyl or cycloalkyl moiety forming the viscosity modifying polymer are substantially pure monomers or can contain minor proportions of structurally related alkyls and cycloalkyls.

At block 414 the LPC premix components received in the second vessel are heated to between 320° F. and 500° F. with medium or high shear mixing for 1 minute to 1 hour to generate the LPC premix having partially dispersed cross-linking polymer cores therein. The cross-linking polymer is received in the second vessel as pellets (i.e., granules or particles) ranging in size from approximately ½ inch mesh granules (or 12.7 mm) down to 200 mesh (or 0.074 mm) particles. As used herein, the terms "granules" and "particles" are general references to large polymer pellets (granules) versus small polymer pellets (particles), but do not otherwise connote a particular size of polymer pellet. During this heating and mixing step, the cross-linking polymer pellets begin to unwind from their pellet configuration but retain a macroscopic (visible to the naked eye) or microscopic (not visible to the naked eye, i.e., requiring magnification to visualize) pellet core connected to at least some of the polymer chains that have unwound from the pellet. Inventors hypothesize that desirable mechanical properties flow from preventing complete dissolution of the cross-linking polymers into the LPC premix. Therefore, a desired degree of dissolution of the cross-linking polymers into the LPC premix is one where a measurable fraction of the added cross-linking polymer pellets retain core portions that are undissolved.

The temperature at which the mixture of the asphalt feedstock and the one or more cross-linking polymers is heated in block 414 results from a balance of competing limitations, the flashpoint of the mixture of LPC premix components and the time required to mix the cross-linking polymer into the bituminous asphalt feedstock to the degree desired for generating the LPC premix. The upper limit of 500° F. is the theorized highest flashpoint for any formulation of the LPC premix, while certain formulations may have a lower flashpoint requiring heating at lower temperatures. The lower limit of 320° F. is the theorized lowest temperature at which the cross-linking polymer could begin dissolution into the asphalt feedstock and proceed to a desired degree during a commercially feasible mixing time without proceeding beyond the desired degree of dissolution, i.e. too completely dissolving into the asphalt feedstock. Thus, as the heating temperature increases for any given LPC premix formulation, the mixing time is reduced. Similarly, as the heating temperature decreases, the mixing time is extended.

The method continues in the vessel 3 column at block 416 where the modified bitumen premix and the LPC premix are received in a third vessel. In some embodiments, the third vessel is the first vessel containing the modified bitumen premix, and the LPC premix is simply added to the modified bitumen premix in the first vessel. In other embodiments, the third vessel is the second vessel containing the LPC premix, and the modified bitumen premix is simply added to the LPC premix in the second vessel.

At block 418 a peroxide cross-linking agent is added to the third vessel. In some non-limiting embodiments, the peroxide cross-linking agent is one of dicumylperoxide, di-t-butylperoxide, t-butylcumylperoxide, 1,4-bis(t-butylperoxyisopropyl)benzene, 2,5-bis-(t-butylperoxy)-2,5-dimethylhexane, 4,4-di-t-butylperoxy-n-butylvalerate, t-butylperbenzoate, benzoyl peroxide, 1,1-di(t-butylperoxy)-3,3,5-trimethylcyclohexane, and any other commercially available peroxide compound.

At block 420 the combination of the modified bitumen premix, the LPC premix, and the peroxide cross-linking agent are heated to 320° F. and 500° F. with blending for 30 minutes to 240 minutes to generate a bitumen composition incorporating LPCs, termed the modified LPC product. During this blending and heating step, the peroxide cross-linking agent and peroxide coagent react with the partially dispersed cross-linking polymer from the LPC premix. Generally, the cross-linking of rubber compounds and other polymers with peroxide cross-linking agents proceeds via a radical mechanism. First, the peroxide cross-linking agent undergoes hemolytic cleavage at the blending temperature of 320° F. to 500° F. to form peroxide free-radicals. These peroxide free-radicals may be fragmented into primary and secondary radicals. These radical species then react with rubber or polymer chains leading to the formation of macromolecular radicals. The macromolecular radicals then typically recombine to form C—C cross-linking bonds.

The C—C cross-links can be between the cross-linking polymer and itself, other cross-linking polymers, natural rubber chains, and other compounds in the LPC premix containing C=C double bonds and C—H bonds susceptible to C—C insertions mediated by peroxide free-radicals. These cross-links have the effect of preventing further unwinding of the remaining cross-linking polymer cores from the LPC premix by locking the cross-linking polymers making up such cores in place with cross-links. These cross-links occur between different cross-linking polymer chains in a particular core, between a single cross-linking polymer chain in a particular core, between different cross-linking polymer chains in two different cores, between a partially unwound cross-linking polymer chain and a polymer chain fully incorporated into a core, between a partially unwound cross-linking polymer chain on one core and a partially unwound cross-linking polymer chain on the same core or a second core, and any combination thereof. Thus, when the cross-linking polymer and the peroxide cross-linking agent are present in sufficiently high concentrations, the cross-linking polymer cross-links to form localized polymer concentrations ("LPCs") that remain in place and do not dissolve into the modified bitumen RDP premix, the LPC premix, or the combination of the two premixes, even after an extended period. Because the C—C bond cross-links exhibit higher disassociation energy as compared to sulfidic cross-links, peroxide cured products generally resist high temperature aging better than sulfur cross-linked products.

As with the heating steps of blocks 408 and 414 above, the upper limit of 500° F. is the theorized highest flashpoint for any formulation of the modified LPC product, while certain formulations may have a lower flashpoint requiring heating at lower temperatures. The lower limit of 320° F. is the theorized lowest temperature at which the modified bitumen premix and the LPC premix thoroughly mix and cross-link in a commercially viable amount of time. Thus, as the heating temperature increases for any given modified LPC product formulation, the mixing time may be reduced. Similarly, as the heating temperature decreases, the mixing time may be extended.

System for Producing LPC Compounds

Figure 5:
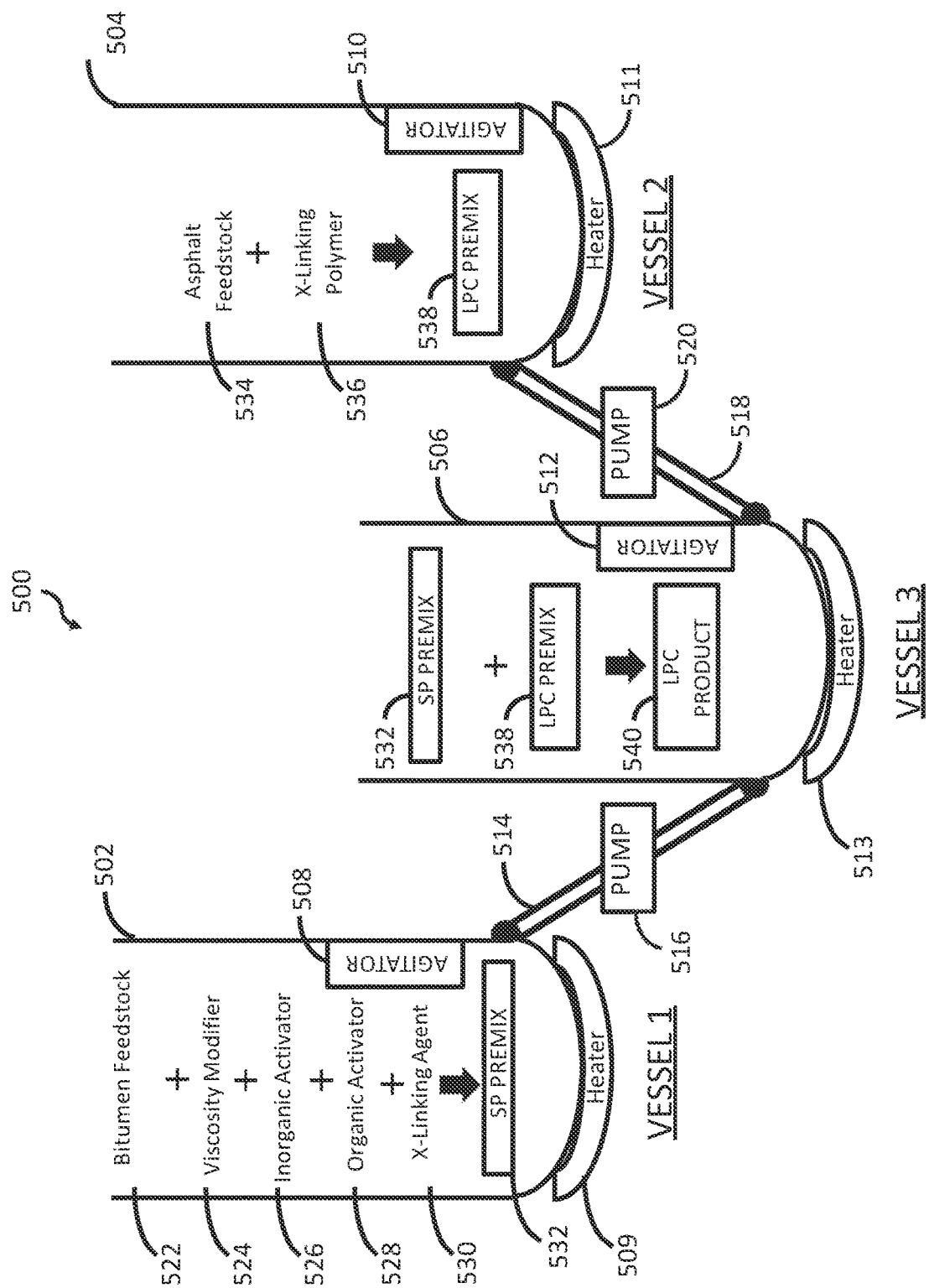
FIG. 5 shows a diagram of a system for generating a roofing coating having localized polymer concentrations.

Referring now to FIG. 5 there is shown a system 500 that controls a process that modifies asphalt feedstock with microstructural and/or macrostructural local polymer concentrations ("LPCs") to generate an LPC product. The illustrative system 500 includes a first vessel 502, a second vessel 504, and a third vessel 506. Each vessel 502, 504, 506 includes an agitator 508, 510, 512 to mix and blend the components therein, as well as a heater 509, 511, 513 to heat the components therein. The first vessel 502 is coupled to the third vessel 506 through a transfer line 514 and a pump 516. The second vessel 504 is coupled to the third vessel 506 through a corresponding transfer line 518 and pump 520.

Each of the vessels 502, 504, 506 are standard mixing vessels for component preparation that may be metal, glass, or ceramic, and particularly of a stainless steel construction. The vessels 502, 504, 506 may be open to atmosphere or enclosed, and while such enclosure need not be airtight, it may be a chamber having an interior space sealed from external atmosphere.

Each of the agitators 508, 510, 512 may be an impeller (i.e., disperser blade), a rotor stator, an anchor (i.e., sweeping blade), a planetary mixer, or other stirring implement, and any combination thereof located within an interior space of the corresponding vessel 502, 504, 506. The agitators 508, 510, 512 mix and/or circulate the contents of the corresponding vessel 502, 504, 506 before, during, and after the respective heater 509, 511, 513 activates. In some non-limiting embodiments, the impeller may provide medium shear mixing by operating at intermediate RPMs ranging from 200 RPM-3500 RPM, or high shear mixing by operating at high RPMs ranging from 350 RPM-4500 RPM. In some non-limiting embodiments, the rotor stator may provide medium shear mixing by operating at intermediate RPMs ranging from 200 RPM-3500 RPM, or high shear mixing by operating at high RPMs ranging from 350 RPM-4500 RPM. In some non-limiting embodiments, the anchor agitator may provide low shear mixing by operating at low RPMs ranging from <1 RPM-200 RPM. In some non-limiting embodiments, the planetary mixer may provide low shear mixing by operating at low RPMs ranging from <1 RPM-200 RPM, medium shear mixing by operating at intermediate RPMs ranging from 50-1000 RPM, or high shear mixing by operating at high RPMs ranging from 350 RPM-4500 RPM. The respective heaters 509, 511, 513 may be electric coil heaters located at or near the base of the respective vessel 502, 504, 506, or a suitable industrial equivalent. In some embodiments, the respective heaters 509, 511, 513 may be heating and/or cooling jackets surrounding some or all of the exterior of the respective vessels 502, 504, 506.

In an illustrative embodiment, the system 500 is employed to perform the method 300 for generating a LPC product. In this illustrative embodiment, the first vessel 502 may receive a bitumen feedstock 522, a viscosity modifier 524, an organic activator 526, an inorganic activator 528, a cross-linking agent 530, and any combination thereof within the interior space of the vessel 502. Thus, in the illustrative embodiment, the agitator 508 of the first vessel 502 mixes and/or circulates the bitumen feedstock 522, viscosity modifier 524, organic activator 526, inorganic activator 528, cross-linking agent 530, and any combination thereof with or without heat from the heater 509 during production of the saturated polymer ("SP") premix 532. The agitator 508 of the first vessel 502 also mixes and/or circulates the SP premix 532 after generation from the components in the first vessel 502, until transference of the SP premix 532 to the third vessel 506. The SP premix 532 produced in the first vessel 502 can be pumped through the transfer line 514 by the pump 516 to the third vessel 506 where the SP premix is received in an interior space of the third vessel 506.

The second vessel 504 receives an asphalt feedstock 534 and one or more cross-linking polymer 536 within an interior space of the second vessel 504. In the second vessel 504, the corresponding agitator(s) 510 mixes and/or circulates the asphalt feedstock 534 and cross-linking polymer 536 about the interior space of the second vessel 504 with or without heat from the heater 511. The one or more agitator 510 of the second vessel 504 also mixes and/or circulates the LPC premix 538 about the interior space of the second vessel 504 after generation from the components in the second vessel 504. The LPC premix 538 generated in the second vessel 504 can be pumped through the transfer line 518 by the pump 520 to the third vessel 506 where the LPC premix is received in the interior space of the third vessel 506.

In the third vessel 506, the one or more agitator 512 mixes, circulates, and/or blends the SP premix 532 and the LPC premix 538, as well as the LPC product 540 generated therefrom about the interior space of the third vessel 506 with or without heat from the heater 513. In various embodiments, the third vessel 506 may serve the dual purpose of both generating the LPC product and storing that generated LPC product. In other embodiments, the LPC product generated in the third vessel 506 is transferred by pump (not shown) to a long-term storage container (not shown).

In another illustrative embodiment, the system 500 is employed to perform the modified method 400 for generating a modified LPC product. In this embodiment, the first vessel 502 may receive a bitumen feedstock, a viscosity modifying polymer, an organic activator, and any combination thereof within the interior space of the vessel 522. Thus, in this embodiment, the one or more agitator 508 of the first vessel 502 mixes and/or circulates the bitumen feedstock, viscosity modifying polymer, and organic activator with or without heat from the heater 509 during production of the modified bitumen premix. The one or more agitator 508 of the first vessel 502 also mixes and/or circulates the modified bitumen premix after generation from the components in the first vessel 502, until transference of the modified bitumen premix to the third vessel 506. The modified bitumen premix produced in the first vessel 502 can then be pumped through the transfer line 514 by the pump 516 to the third vessel 506 where the modified bitumen premix is received in the interior space of the third vessel 506.

The second vessel 504 receives an asphalt feedstock and one or more cross-linking polymer within an interior space of the second vessel 504. In the second vessel 504, the agitator(s) 510 mixes and/or circulates the asphalt feedstock and cross-linking polymer(s) about the interior space of the second vessel 504 with or without heat from the heater 511. The agitator(s) 510 also mixes and/or circulates the LPC premix about the interior space of the second vessel 504 after generation from the components in the second vessel 504. The LPC premix generated in the second vessel 504 can be pumped through the transfer line 518 by the pump 520 to the third vessel 506 where the LPC premix is received in the interior space of the third vessel 506.

The third vessel 506, thus receives the modified bitumen premix and the LPC premix in an interior space. The third vessel 506 may further receive a peroxide cross-linking agent in the interior space. The peroxide cross-linking agent may be received in the interior space of the third vessel 506 with mixing, without mixing, with heating or without heating. Further, the peroxide cross-linking agent may be received in the interior space of the third vessel 506 prior to, during, or after reception of the modified bitumen premix and the LPC premix. The one or more agitator 512 of the third vessel 506 mixes, circulates, and/or blends the modified bitumen premix, the LPC premix 538, the peroxide cross-linking agent, the modified LPC product generated therefrom, and any combination thereof with or without heat from the heater 513.

In various embodiments, the third vessel 506 may serve the dual purpose of both generating the modified LPC product and storing that generated modified LPC product. In other embodiments, the modified LPC product generated in the third vessel 506 is transferred by pump (not shown) to a long-term storage container (not shown).

Additional System for Producing LPC Compounds

Figure 6:
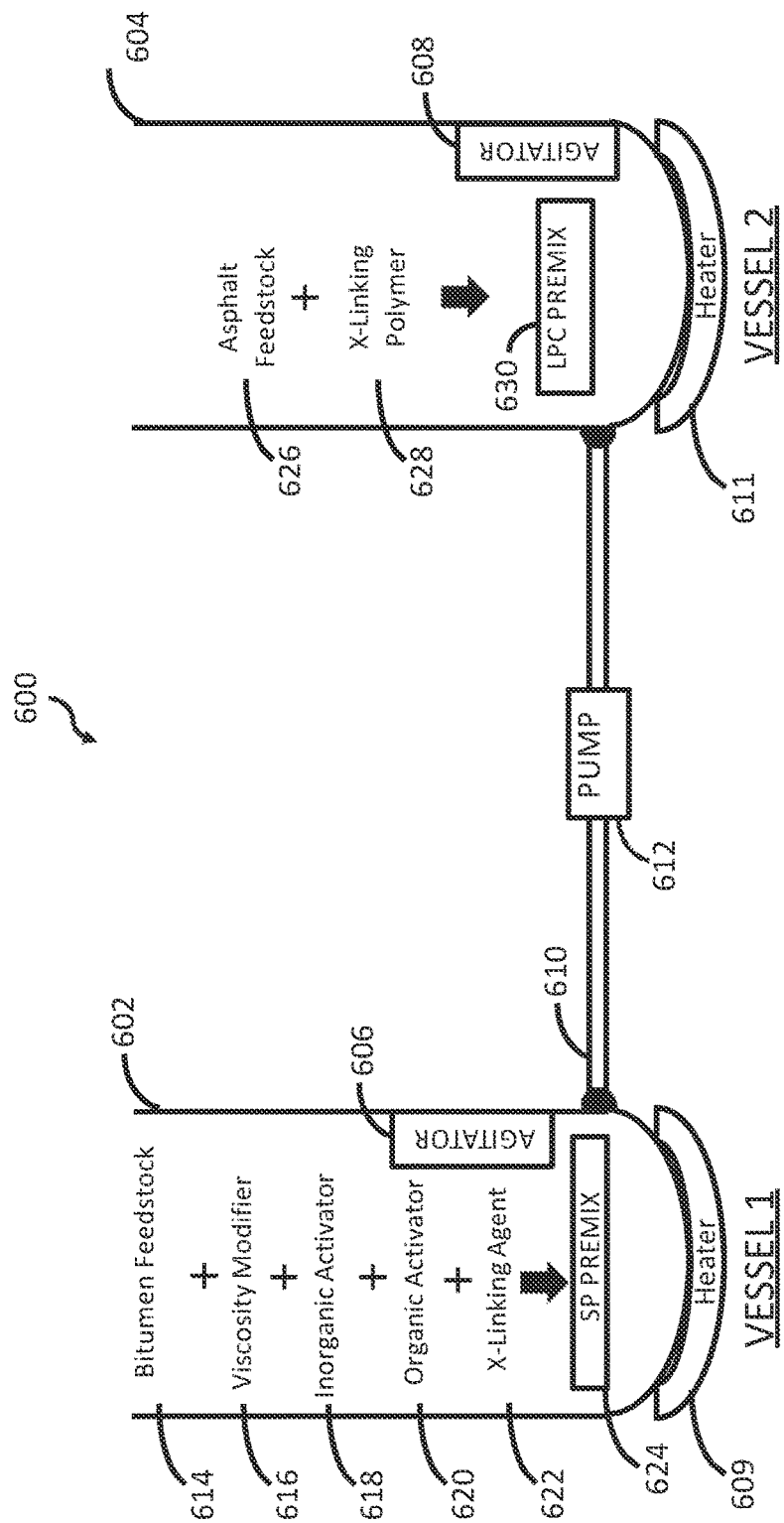
FIG. 6 shows a diagram of another system for generating a roofing coating having localized polymer concentrations.

Referring now to FIG. 6, there is shown a system 600 that controls a process that modifies asphalt feedstock with microstructural and/or macrostructural local polymer concentrations ("LPCs"). The illustrative system 600 includes a first vessel 602 and a second vessel 604. Each vessel 602, 604 includes an agitator 606, 608 to mix and blend the components therein, and a heater 607, 609 to heat the components therein. The first vessel 602 and second vessel 604 are coupled through a transfer line 610 and a pump 612.

Both of the vessels 602, 604 are standard mixing vessels for component preparation that may be metal, glass, or ceramic, and particularly of a stainless steel construction. The vessels 602, 604 may be open to atmosphere or enclosed, and while such enclosure need not be airtight, it may be a chamber having an interior space sealed from external atmosphere.

Both of the agitators 606, 608 may be an impeller (i.e., disperser blade), a rotor stator, an anchor (i.e., sweeping blade), a planetary mixer, or other stirring implement, and any combination thereof located within the interior space of the corresponding vessel 602, 604 before, during, and after the respective heater 607, 609 activates. In some non-limiting embodiments, the impeller may provide medium shear mixing by operating at intermediate RPMs, ranging from 200 RPM-3500 RPM, or high shear mixing by operating at high RPMs ranging from 350 RPM-4500 RPM. In some embodiments, the rotor stator may provide medium shear mixing by operating at intermediate RPMs ranging from 200 RPM-3500 RPM, or high shear mixing by operating at high RPMs ranging from 350 RPM-4500 RPM. In some embodiments, the anchor agitator may provide low shear mixing by operating at low RPMs ranging from <1 RPM-200 RPM. In some non-limiting embodiments, the planetary mixer may provide low shear mixing by operating at low RPMs ranging from <1 RPM-200 RPM, medium shear mixing by operating at intermediate RPMs ranging from 50 RPM-1000 RPM, or high shear mixing by operating at high RPMs ranging from 350 RPM-3000 RPM. The agitators 606, 608 mix and/or circulate the contents of the corresponding vessel 602, 604. The respective heaters 607, 609 may be electric coil heaters located at or near the base of the respective vessel 602, 604, or a suitable industrial equivalent. In some embodiments, the respective heaters 607, 609 may be heating and/or cooling jackets surrounding some or all of the exterior of the respective vessels 602, 604.

In an illustrative embodiment, the system 600 is employed to perform the method 300 for generating a LPC product. In this illustrative embodiment, the first vessel 602 may receive a bitumen feedstock 614, a viscosity modifier 616, an inorganic activator 618, an organic activator 620, a cross-linking agent 622, and any combination thereof within the interior space of the vessel 602. Thus, in the illustrative embodiment, the one or more agitator 606 of the first vessel 602 mixes and/or circulates the bituminous feedstock compound 614, viscosity modifier 616, organic activator 618, inorganic activator 620, and cross-linking agent 622 about the interior space of the first vessel 602 during production of the SP premix 624 with or without heat from the heater 607. The agitator 606 of the first vessel 602 also mixes and/or circulates the SP premix 624 about the interior space of the first vessel 602 after generation from the components in the first vessel 602. In some embodiments, the SP premix 624 can be pumped through the transfer line 610 by the pump 612 to the second vessel 604.

The second vessel 604 receives an asphalt feedstock 626 and one or more cross-linking polymer 628 within an interior space of the second vessel 604. In the second vessel 604, the corresponding agitator(s) 608 mixes and/or circulates the asphalt feedstock 626 and cross-linking polymer 628 about the interior space of the second vessel 604 with or without heat from the heater 609. The agitator 608 of the second vessel 604 also mixes and/or circulates the LPC premix 630 about the interior space of the second vessel 604 after generation from the components in the second vessel 604. The LPC premix 630 generated in the second vessel 604 can be pumped through the transfer line 610 by the pump 612 to the first vessel 602.

In one embodiment, the first vessel 602 receives the LPC premix 630 from the second vessel 604 through the transfer line 610. The agitator(s) 606 of the first vessel 602 then mixes and blends the SP premix 624 prepared therein and the LPC premix 630 received from the second vessel 604 with or without heat from the heater 607. In the first vessel 602, the agitator 606 mixes, circulates, and/or blends the SP premix 624 and the LPC premix 630, as well as the LPC product (not shown) generated therefrom about the interior space of the first vessel 602. In various embodiments, the first vessel 602 may serve the further purpose of storing the LPC product generated therein. In other embodiments, the LPC product generated in the first vessel 602 is transferred by pump (not shown) to a long-term storage container (not shown).

In another embodiment, the second vessel 604 receives the SP premix 624 from the first vessel 602 through the transfer line 610. The agitator(s) 608 of the second vessel 604 then mixes and blends the LPC premix 630 prepared therein and the SP premix 624 received from the first vessel 602 with or without heat from the heater 609. In the second vessel 604, the agitator 608 mixes, circulates, and/or blends the SP premix 624 and the LPC premix 630, as well as the LPC product (not shown) generated therefrom about the interior space of the second vessel 604. In various embodiments, the second vessel 604 may serve the further purpose of storing the LPC product generated therein. In other embodiments, the LPC product generated in the second vessel 604 is transferred by pump (not shown) to a long-term storage container (not shown).

In another illustrative embodiment, the system 600 is employed to perform the modified method 400 for generating a modified LPC product. In this embodiment, the first vessel 602 may receive a bitumen feedstock, a viscosity modifying polymer, an organic activator, and any combination thereof within the interior space of the vessel 602. Thus, in this embodiment, the agitator 606 of the first vessel 602 mixes and/or circulates the bitumen feedstock, viscosity modifying polymer, and organic activator with or without heat from the heater 609 during production of the modified bitumen premix. The agitator 606 of the first vessel 602 also mixes and/or circulates the modified bitumen premix after generation from the components in the first vessel 602, such as until transference of the modified bitumen premix to the second vessel 604 when the modified bitumen premix produced in the first vessel 602 is pumped through the transfer line 610 by the pump 612 to the second vessel 604 where the modified bitumen premix is received in the interior space of the second vessel 604. In other embodiments, the agitator 606 of the first vessel 602 also mixes and/or circulates the modified bitumen premix after generation from the components in the first vessel 602, such as until and after receipt of the LPC premix through the transfer line 610 from the second vessel 604.

The first vessel may further receive a peroxide cross-linking agent in the interior space. The peroxide cross-linking agent may be received in the interior space of the first vessel 602 with mixing, without mixing, with heating or without heating. Further, the peroxide cross-linking agent may be received in the interior space of the first vessel 602 prior to, during, or after reception of the LPC premix from the second vessel 604. The one or more agitator 606 of the first vessel 602 mixes, circulates, and/or blends the modified bitumen premix, the LPC premix, the peroxide cross-linking agent, the modified LPC product generated therefrom, and any combination thereof with or without heat from the heater 609.

The second vessel 604 receives an asphalt feedstock and one or more cross-linking polymer within an interior space of the second vessel 604. In the second vessel 604, the agitator(s) 608 mixes and/or circulates the asphalt feedstock and cross-linking polymer(s) about the interior space of the second vessel 604 with or without heat from the heater 611. The agitator(s) 608 also mixes and/or circulates the LPC premix about the interior space of the second vessel 604 after generation from the components in the second vessel 604, such as until transference of the LPC premix to the first vessel 602 when the LPC premix produced in the second vessel 604 is pumped through the transfer line 610 by the pump 612 to the first vessel 602 where the LPC premix is received in the interior space of the first vessel 602. In other embodiments, the agitator 608 of the second vessel 604 also mixes and/or circulates the LPC premix after generation from the components in the second vessel 604, such as until and after receipt of the modified bitumen premix through the transfer line 610 from the first vessel 602.

The second vessel 604, may further receive a peroxide cross-linking agent in the interior space. The peroxide cross-linking agent may be received in the interior space of the second vessel 604 with mixing, without mixing, with heating or without heating. Further, the peroxide cross-linking agent may be received in the interior space of the second vessel 604 prior to, during, or after reception of the modified bitumen premix. The one or more agitator 608 of the second vessel 604 mixes, circulates, and/or blends the modified bitumen premix, the LPC premix, the peroxide cross-linking agent, the modified LPC product generated therefrom, and any combination thereof with or without heat from the heater 611.

In various embodiments, the first vessel 602 or the second vessel 604 may serve the dual purpose of both generating the modified LPC product and storing the modified LPC product. In other embodiments, the modified LPC product generated in either of the first vessel 602 and the second vessel 604 is transferred by pump (not shown) to a long-term storage container (not shown).

LPC Embodiments

In the illustrative LPC embodiments presented herein, the LPC compound is generated from blending a LPC premix and a SP premix at a temperature between 390° F. and 410° F. for between 30 minutes and 240 minutes. The SP premix is generated from medium or high shear mixing of sulfur, calcium stearate, zinc oxide, 4% to 8% SEBS by weight, and a bitumen feedstock compound. In some embodiments, the bitumen feedstock compound is an RDP compound that is 5% to 50% by weight tire rubber. During the medium or high shear mixing, the SP premix is heated to a temperature between 390° F. and 410° F. for between 15 minutes and 45 minutes to fully disperse the SEBS into the liquid media of the bitumen feedstock compound. In the illustrative embodiment, the LPC premix is generated from abbreviated medium or high shear mixing of SBS copolymer, SB copolymer, and asphalt at a temperature between 390° F. and 410° F. This abbreviated mixing and heating occurs for between 1 minute and 5 minutes to partially disperse the SBS copolymer and SB copolymer into the bitumen. The partial dispersion results in an LPC premix that includes partially or entirely undissolved SBS copolymer and SB copolymer cores mixed throughout. These SBS copolymer and SB copolymer cores are cross-linked by sulfur from the SP premix, which causes the SBS copolymer and SB copolymer cores to persist and form LPCs in the resulting LPC compound.

Compositions

Additional compositions of matter can be formulated with the LPC compound, which are generally referred to as "LPC applications." All of these compositions are bitumen-based and include fully dispersed viscosity modifying polymer, partially dispersed and cross-linked cross-linking polymer having local concentrations centered about cross-linking polymer cores, and tire rubber dissolved in an asphalt feedstock. In the illustrative embodiment, the composition of the LPC compound includes fully dispersed SEBS copolymer that surrounds the partially dispersed and cross-linked SBS and SB copolymers forming LPCs in an extended polymer network that incorporates the natural rubber polymers from the dissolved tire rubber in the bitumen feedstock compound starting material used to prepare the SP premix.

Figure 7:
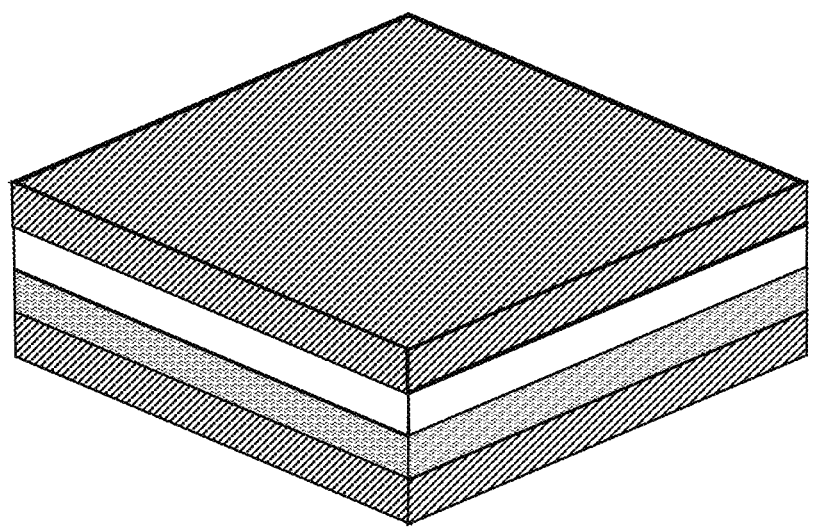
FIG. 7 shows an exemplary layered impact resistant shingle.

The LPC compound described above may be used to make mastics, roof coatings, solvent and emulsion based, waterproofing primers, roofing with chopped fiber or partially saturated reinforcements or sub layers. Additionally, the LPC compound may also be used with adhesives and sealants for roofing shingles 700, as shown in FIG. 7, and self-applied roofing and waterproofing membranes. In some embodiments, the LPC compound is liquid-applied to a base material 702 having an upper surface and a lower surface that are each covered by the LPC compound 704 to form an impact resistant shingle 700 having Class 4 impact resistance. The base material may include a mat sheet 702a, a felt sheet, felt saturated with asphalt, synthetic fabric, fiber glass, fibrous organic mat, fibrous inorganic mat 702b. The base material may also be termed a reinforcement layer. In some embodiments, the LPC compound is liquid-applied to several reinforcement layers 702a and 702b that are bound together in parallel sheets to form an impact resistant shingle having Class 4 impact resistance. In further embodiments, the LPC shingles include tiny granules, such as sand, mica, or the like.

Further still, chemical treatment of the LPC compound can also be performed using various acids and catalysts common to the roofing industry. For example, the addition of super polyphosphoric acid may be used to improve flow properties of the bitumen and likewise enhance the utility of the LPC compound.

Oxidized asphalt is routinely prepared using a range of acids and additives to catalyze the oxidation process by reducing the air blowing time and improve the desired properties of penetration, softening point, and viscosity. The LPC compound disclosed herein can be used to air blow with or without catalyst to make a roof coating that yields improved weathering from the carbon black and oils released from the tire rubber of the bituminous feedstock compound incorporated therein. Likewise, post blending of the LPC compound into oxidized roofing coating improves penetration and viscosity, yielding improved weathering performance of the resulting coating.

Further, incorporation of LPCs into bituminous feedstock and/or dissolved tire rubber bitumen compositions add to the benefits described above: improved impact resistance, extended service life of shingles made from such bitumen compositions, and reduced pressure on landfills resulting from used/damaged shingle waste. The processes disclosed herein also provide the benefits of increased material saturation from high operating temperatures, faster line speeds, higher filler incorporation, and reduced blisters due to lower viscosity compositions for processing.

Table IV displays the various embodiments disclosed herein:

TABLE IV

| Embodiment | Process Elements |
|---|---|
| FIG. 1 method for dissolving tire rubber | 1%-70% tire rubber and asphalt bitumen feedstock heated to 525° F.-700° F. for 5 min-60 min |
| FIG. 2 system for dissolving rubber | Rubber and bitumen mixed in reaction vessel at 525° F.-700° F. under non-oxidizing gas |
| FIG. 3 method for incorporating LPCs | RDP compound containing <70% tire rubber, 4%-8% SEBS, zinc oxide, calcium stearate, and sulfur heated to 400° F. for 15 min-45 min; asphalt feedstock, SB, and SBS heated to 400° F. for 1 min-5 min; LPC premix and RDP premix heated to 400° F. for 30 min-240 min; |

TABLE IV-continued

| Embodiment | Process Elements |
| --- | --- |
| FIG. 4 modified method for incorporating LPCs | RDP compound containing <70% tire rubber, viscosity modifying polymer, and peroxide coagent heated to 320° F. to 500° F. for 15 min-60 min;<br>asphalt feedstock and X-linking polymer heated to 320° F. to 500° F. for 1 min-60 min;<br>bitumen premix, LPC premix, and peroxide x-linking agent heated to 320° F. to 500° F. for 30 min-240 min |
| Example 1 | 10% GTR stirred into bitumen at 320° F.-420° F. and mixed for 30 min, scrap tire rubber and bitumen heated to 605° F. for 15 min, and cooled to between 350° F.-360° F. |
| Example 2 | 20% 80 mesh GTR stirred into bitumen at 320° F.-420° F. and mixed for 30 min, GTR and bitumen heated to 605° F. for 15 min, and cooled to between 350° F.-360° F. |
| Example 3 | 20% 30 mesh GTR stirred into bitumen at 320° F.-420° F. and mixed for 30 min, GTR and bitumen heated to 605° F. for 15 min, and cooled to between 350° F.-360° F. |
| Modified and Enhanced Example 4 | RDP compound, asphalt feedstock, and sulfur low shear mixed at 380° F. for 4 hours.<br>SBS added and mixed under high shear for 60 minutes at 380° F. |
| Modified and Enhanced Example 5 | RDP compound, asphalt feedstock, and sulfur low shear mixed at 380° F. for 4 hours.<br>SBS added and mixed under high shear for 30 minutes at 380° F. |

It is to be understood that the detailed description of illustrative embodiments are provided for illustrative purposes. The scope of the claims is not limited to these specific embodiments or examples. Therefore, various process limitations, elements, details, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. An impact resistant shingle comprising:
a base material having an upper surface and a lower surface;
a local polymer concentration ("LPC") asphalt shingle coating including a saturated polymer ("SP") premix and a LPC premix, wherein the SP premix and the LPC premix are blended and heated to between 320° F. and 500° F. for between 30 minutes and 240 minutes to form the LPC asphalt shingle coating, wherein the LPC asphalt shingle coating covers at least one of the base material upper surface and the base material lower surface;
wherein the SP premix includes a bitumen feedstock and a cross-linking agent, in which the bitumen feedstock and the cross-linking agent heated to between 320° F. and 500° F. and mixed for between 15 minutes and 60 minutes;
wherein the bitumen feedstock includes at least one of a bitumen compound and a rapid digestion process ("RDP") compound that includes an unmodified RDP compound, a modified RDP compound, an enhanced RDP compound, and a modified enhanced RDP compound; and
wherein the LPC premix includes a cross-linking polymer and an asphalt feedstock, in which the cross-linking polymer and the asphalt feedstock are heated to between 320° F. and 500° F. and mixed for between 1 minute and 60 minutes.

2. The impact resistant shingle of claim 1 wherein the SP premix further comprises a viscosity modifying polymer.

3. The impact resistant shingle of claim 2 wherein the viscosity modifying polymer is styrene ethylene butadiene styrene ("SEBS") copolymer; and
wherein the SP premix comprises between 4% and 8% SEBS copolymer.

4. The impact resistant shingle of claim 1 wherein the SP premix further comprises at least one of an organic activator and an inorganic activator; and
wherein the cross-linking agent is a sulfur cross-linking agent.

5. The impact resistant shingle of claim 4 wherein the organic activator is calcium stearate and the inorganic activator is zinc oxide.

6. The impact resistant shingle of claim 1 wherein the SP premix further comprises an organic activator; and
wherein the cross-linking agent is a peroxide coagent.

7. The impact resistant shingle of claim 1 wherein the LPC asphalt shingle coating is liquid-applied during manufacture of the impact resistant shingle.

8. The impact resistant shingle of claim 1 having a Class 4 impact resistance.

9. The impact resistant shingle of claim 1 wherein the RDP compounds include 1% to 70% tire rubber.

10. The impact resistant shingle of claim 1 wherein the cross-linking polymer includes at least one of a styrene butadiene styrene ("SBS") copolymer and a styrene butadiene ("SB") copolymer.

11. A local polymer concentration ("LPC") asphalt shingle coating compound comprising:
a saturated polymer ("SP") premix and a LPC premix, wherein the SP premix and the LPC premix are blended and heated to between 320° F. and 500° F. for between 30 minutes and 240 minutes to form the LPC asphalt shingle coating;
wherein the SP premix includes a bitumen feedstock and a cross-linking agent, wherein the bitumen feedstock and the cross-linking agent are heated to between 320° F. and 500° F. and mixed for between 15 minutes and 60 minutes to form the SP premix;
wherein the bitumen feedstock includes at least one of a bitumen compound and a rapid digestion process ("RDP") compound including one of an unmodified RDP compound, a modified RDP compound, an enhanced RDP compound, and a modified enhanced RDP compound; and
wherein the LPC premix includes a cross-linking polymer and an asphalt feedstock, in which the cross-linking polymer and the asphalt feedstock are heated to between 320° F. and 500° F. and mixed for between 1 minute and 60 minutes.

12. The LPC asphalt shingle coating compound of claim 11 wherein the SP premix further includes a viscosity modifying polymer.

13. The LPC asphalt shingle coating compound of claim 12 wherein the viscosity modifying polymer is styrene ethylene butadiene styrene ("SEBS") copolymer; and
wherein the SP premix includes between 4% and 8% of the viscosity modifying polymer.

14. The LPC asphalt shingle coating compound of claim 11 wherein the SP premix further includes one of an organic activator, an inorganic activator, and a combination thereof; and wherein the cross-linking agent is a sulfur cross-linking agent.

15. The LPC asphalt shingle coating compound of claim 14 wherein the organic activator is calcium stearate and the inorganic activator is zinc oxide.

16. The LPC asphalt shingle coating compound of claim 11 wherein the SP premix further includes an organic activator; and wherein the cross-linking agent is a peroxide coagent.

17. The LPC asphalt shingle coating compound of claim 11 wherein the RDP compounds include 1% to 70% tire rubber.

18. The LPC asphalt shingle coating compound of claim 11 wherein the cross-linking polymer includes at least one of styrene butadiene styrene ("SBS") copolymer, styrene butadiene ("SB") copolymer, and a combination thereof.

19. The LPC asphalt shingle coating compound of claim 11 wherein the SP premix is heated to between 390° F. and 410° F.

20. The LPC asphalt shingle coating compound of claim 11 wherein the cross-linking polymer and the asphalt feedstock are mixed for between 1 minute and 5 minutes to generate the LPC premix.

* * * * *